(12) United States Patent
Criminisi et al.

(10) Patent No.: US 7,570,803 B2
(45) Date of Patent: Aug. 4, 2009

(54) VIRTUAL CAMERA TRANSLATION

(75) Inventors: Antonio Criminisi, Cambridge (GB); Andrew Blake, Stapleford (GB); Philip H. S. Torr, Cambridge (GB); Jamie Shotton, Oxford (GB)

(73) Assignee: Microsoft Corporation, Redmond, WA (US)

( * ) Notice: Subject to any disclaimer, the term of this patent is extended or adjusted under 35 U.S.C. 154(b) by 879 days.

(21) Appl. No.: 10/763,453

(22) Filed: Jan. 23, 2004

(65) Prior Publication Data
US 2005/0078866 A1  Apr. 14, 2005

Related U.S. Application Data

(63) Continuation-in-part of application No. 10/681,007, filed on Oct. 8, 2003.

(51) Int. Cl.
*G06K 9/00* (2006.01)
(52) U.S. Cl. ...................................... 382/154
(58) Field of Classification Search .................. None
See application file for complete search history.

(56) References Cited

U.S. PATENT DOCUMENTS

| | | | |
|---|---|---|---|
| 5,359,362 A | 10/1994 | Lewis et al. | |
| 6,023,523 A * | 2/2000 | Cohen et al. | 382/154 |
| 6,072,496 A | 6/2000 | Guenter et al. | |
| 6,198,852 B1 * | 3/2001 | Anandan et al. | 382/284 |
| 6,304,288 B1 | 10/2001 | Hamagishi | |
| 6,549,650 B1 * | 4/2003 | Ishikawa et al. | 382/154 |
| 6,559,704 B1 * | 5/2003 | Golliher et al. | 327/333 |
| 6,738,424 B1 * | 5/2004 | Allmen et al. | 375/240.08 |
| 7,015,951 B1 * | 3/2006 | Yoshigahara et al. | 348/207.99 |

OTHER PUBLICATIONS

U.S. Appl. No. 09/528,827, filed Mar. 20, 2000, Microsoft Corporation.

Basu, Sumit, Essa, Irfan, Pentland, Alex; "Motion Regularization for Model-Based Head Tracking." In Proceedings of International Conference on Pattern Recognition, Wien, Austria, 1996 IEEE, pp. 611-616.

Belhumeur, Peter N.; Mumford, David "A Bayesian Treatment of the Stereo Correspondence Problem Using Half-Occluded Regions" IEEE Conference on Computer Vision and Pattern Recognition, 1992, 8pgs.

Black, Michael J., Yacoob, Yaser; "Tracking and Recognizing Rigid and Non-Rigid Facial Motions Using Local Parametric Models of Image Motion"; IEEE Proceedings of International Conference on Computer Vision, Cambridge, MA, 1995, pp. 374-381.

(Continued)

*Primary Examiner*—Matthew C Bella
*Assistant Examiner*—Alex Liew

(57) ABSTRACT

A multi-layer graph for dense stereo dynamic programming can improve synthesis of cyclopean virtual images by distinguishing between stereo disparities causes by occlusion and disparities caused by non-fronto-parallel surfaces. In addition, cyclopean virtual image processing may be combined with simulation of three-dimensional translation of a virtual camera to assist in aligning the user's gaze with the virtual camera. Such translation may include without limitation one or more of the following: horizontal (e.g., left and right) translation of the virtual camera, vertical translation (e.g., up and down) of the virtual camera, and axial translation (e.g., toward the subject and away from the subject) of the virtual camera.

36 Claims, 25 Drawing Sheets

OTHER PUBLICATIONS

Bobick, Aaron F., Intille, Stephen S.; "Large Occlusion Stereo"; HCV 1999, pp. 1-25.

Chen, Shenchange Eric, Williams, Lance; "View Interpolation for Image Synthesis"; SIGGRAPH, 1993, pp. 1-7.

Choi, Chang Seok, Aizawa, Kiyoharu, Harashima, Hiroshi, Takebe, Tsuyoshi; "Analysis and Synthesis of Facial Image Sequences in Model-Based Image Coding" IEEE Transaction on Circuits and Systems for Video Technology v. 4, n 3 Jun. 1994, pp. 257-275.

Cox, Ingemar J., Hingorani, Sunita L., Rao, Satish B., Maggs, Bruce M.; "A Maximum Likelihood Stereo Algorithm" Computer vision and Image Understanding, May 1996, pp. 542-567 (1-47).

Darrell, Trevor, Baback, Moghaddam, Pentland, Alex P.; "Active Face Tracking and Pose Estimation in an Interactive Room" IEEE Computer Vision and Pattern Recognition, 1996, pp. 67-72 (1-16).

DeCarlo, Douglas, Metaxes, Dimitris; "Optical Flow Constraints on Deformable Models with Applications to Face Tracking" International Journal of computer Vision, 2000, pp. 99-127 (1-42).

Gemmell, Jim, Toyama, Kentaro, Zitnick, C. Lawrence, Kang, Thomas, Seitz, Steven; "Gaze Awareness for Video-Conferencing: A Software Approach" Oct.-Dec. 2000, pp. 26-35.

Horprasert, Thanarat, Yacoob, Yaser, Davis, Larry S.; "Computing 3-D Head Orientation From a Monocular Image Sequence"; Interantional Conference Automatic Face and Gesture Recognition, 1996, pp. 242-247.

Ishikawa, Hiroshi, Geiger, Davi; "Occlusions, Discontinuities, and Epipolar Lines in Stereo" The Fifth European Conference on Computer Vision (ECCV '98) Jun. 1998, Germany pp. 1-14.

Kolmogorov, Vladimir, Zabih, Ramin; "Multi-Camera Scene Reconstruction via Graph Cuts"; Proc. Europ. Conf. Computer Vision, Copenhagen, Denmark, May 2002, pp. 1-16.

Li, Haibo, Roivainen, Pertti, Forchheimer, Robert; "3-D Motion Estimation in Model-Based Facial Image Coding" IEEE Transactions on Pattern Analysis and Machine Intelligence, v. 15, n 6, Jun. 1993, pp. 545-555.

Liu, Zicheng, Zhang, Zhengyou, Jacobs, Chuck, Cohen, Michael; "Rapid Modeling of Animated Faces from Video" Proceedings of the Fourth IEEE International Conference on Automatic Face and Gesture Recognition Feb. 2000, pp. 58-67.

Loop, Charles, Zhang, Zhengyou; "Computing Rectifying Homographies for Stereo Vision" Technical Report MSR-TR-99-21, 14 pgs.

Lu, Le, Zhang, Zhengyou, Shum, Heung-Yeung, Liu, Zicheng, Chen, Hong; "Model and Exemplar-Based Robust Head Pose Tracking Under Occlusion and Varying Expression" IEEE Computer Soc. Conf. on Computer Vision & Pattern Recog., Dec. 2001, Hawaii, USA, pp. 1-8.

Newman, Rhys, Matsumoto, Yoshio, Rougeaux, Sebastien, Zelinsky, Alexander; "Real-Time Stereo Tracking for Head Pose and Gaze Estimation" IEEE 2000 pp. 122-128.

Ohta, Yuichi, Kanade, Takeo; "Stereo by Intra-and Inter-Scanline Search Using Dynamic Programming" IEEE 1985, 16 pgs.

Roy, Sebastien, Cox, Ingemar J.; "A Maximum-Flow Formulation of the N-Camera Stereo Correspondence Problem" IEEE Proc. of Int. Conference on Computer Vision, Bombai, Jan. 1998, pp. 492-499.

Scharstein, Daniel, Szeliski, Richard, Zabih, Ramin; "A Taxonomy and Evaluation of Dense Two-Frame Stereo Correspondence Algorithms"; International Journal of Computer Vision, 2002, 10pgs.

Scarstein, Daniel, "Stereo Vision for View Synthesis" IEEE Computer Society Conference on Computer Vision and Pattern Recognition, San Francisco, CA, Jun. 1996 pp. 852-858.

Shi, Jianbo, Tomasi, Carlo; "Good Features to Track"; IEEE Conference on Computer Vision and Pattern Recognition, Seattle WA, Jun. 1994, 7pgs.

Sun, Jian, Shum, Heung-Yeung, Zheng, Nan-Ning; "Stereo Matching Using Belief Propagation" ECCV 2002, pp. 510-524.

Szeliski, Richard; "Prediction Error as a Quality Metric for Motion and Stereo" Vision Technology Group Microsoft Research, Proceeding of the International Conference on Computer Vision, vol. 2, Corfu, Greece, 1999, 8pgs.

Vetter, Thomas "Synthesis of Novel Views From a Single Face Image" Max-Planck-Institut, Germany, Technical Report No. 26, Feb. 1996, pp. 1-13.

Yang, Ruigang, Zhang, Zhengyou; "Eye Gaze Correction with Stereovision for Video-Teleconferencing" Proceedings from the European Conference of Computer Vision, vol. 2, Copenhagen, Denmark May 2002, pp. 479-494.

Zhang, Zhengyou, Liu, Zicheng, Adler, Dennis, Cohen, Michael F., Hanson, Erik, Shan, Ying; "Robust and Rapid Generation of Animated Faces from Video Images: A Model-Based Modeling Approach" Technical Report MSR-TR-2001-101 pp. 1-30.

* cited by examiner

VIRTUAL CAMERA TRANSLATION

RELATED APPLICATIONS

The present application is a continuation-in-part of U.S. patent application Ser. No. 10/681,007, entitled "Gaze Manipulation" and filed Oct. 8, 2003, specifically incorporated herein by reference for all that it discloses and teaches.

TECHNICAL FIELD

The invention relates generally to image processing, and more particularly to gaze manipulation using image processing.

DESCRIPTION

Digital video cameras are useful in both consumer and professional contexts. Generally, digital video cameras capture sequences of digital images, which may then be transferred to a computer system for display or processing or to a storage device for storage.

One specific practice employs a digital video camera in a video conferencing application. In a typical video conference, an image sequence depicting a conference participant is transmitted to one or more other participants. Concurrently, image sequences depicting the other participants are transmitted to the first participant's display device. In this manner, each participant can view an interactive video of the other participants during the conference.

In a typical video teleconferencing environment, a single video camera is focused on a conference participant, who views the other participants in a video window in his or her display device. The video camera is commonly mounted on or near the display of a computer or television system in an attempt to minimize the angle between the camera and the video window. Minimizing this angle can enhance the illusion that the participant is looking into the camera instead of at the video window in the display device. However, the angle is never really eliminated and in fact can remain significant, particularly when the camera is close to the participant. As a result, for example, the other participants receive a display of the top or side of the first participant's head, instead of a straight-on view of the first participant's face.

This situation provides a diminished user experience and limits the effectiveness of such video conferencing. It is difficult to develop trust between participants in the conference because of the difficulty in establishing eye contact (i.e., the displayed participant is looking at his or her display instead of the camera). Likewise, facial expressions may be distorted or obscured by the angular discrepancy, thereby losing some important communication cues.

Conceptually, these problems may be resolved by a physical camera positioned in the center of the display window, such that the participant's gaze and the camera's axis are aligned—envision a video display with a hole drilled in the middle of it in which to mount the camera. However, such configurations are impractical for obvious reasons.

Some of these problems have been addressed by generating a cyclopean virtual image, which approximates an image "captured" by a virtual camera positioned between physical stereo cameras, whether centered or not-centered. However, even centering a virtual camera does not guarantee that it is aligned with a user's gaze. For example, in many desktop video teleconferencing applications, the user's gaze is aligned with the display window showing the other participant's face. In some circumstances, the user may position this display window into one corner of the display screen to allow him or her to work in other windows (e.g., a word processing document window) while participating in the video conference.

Implementations described and claimed herein address these problems with a multi-layer graph for dense stereo dynamic programming to improve processing of virtual camera images. Furthermore, the user's gaze may be satisfactorily aligned with the virtual camera using projection of points of a stereo disparity surface onto the virtual image plane, without requiring construction of a three-dimensional model of the video conference scene.

In various implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. The computer program product encodes a computer program for executing on a computer system a computer process that generates a virtual image from a first image and a second image of a stereo camera pair. The virtual image is projected from an optical center of a virtual camera. The virtual camera is translatable with respect to the stereo camera pair.

In another implementation, a method is provided. A virtual image is generated from a first image and a second image of a stereo camera pair. The virtual image is projected from an optical center of a virtual camera. The virtual camera is translatable with respect to the stereo camera pair.

In yet another implementation, a system provides a cyclopean virtual image generator that generates a virtual image from a first image and a second image of a stereo camera pair. The virtual image is projected from an optical center of a virtual camera. The virtual camera is translatable with respect to the stereo camera pair.

Other implementations are also described and recited herein.

Brief descriptions of the drawings included herein are listed below.

Figure 6:
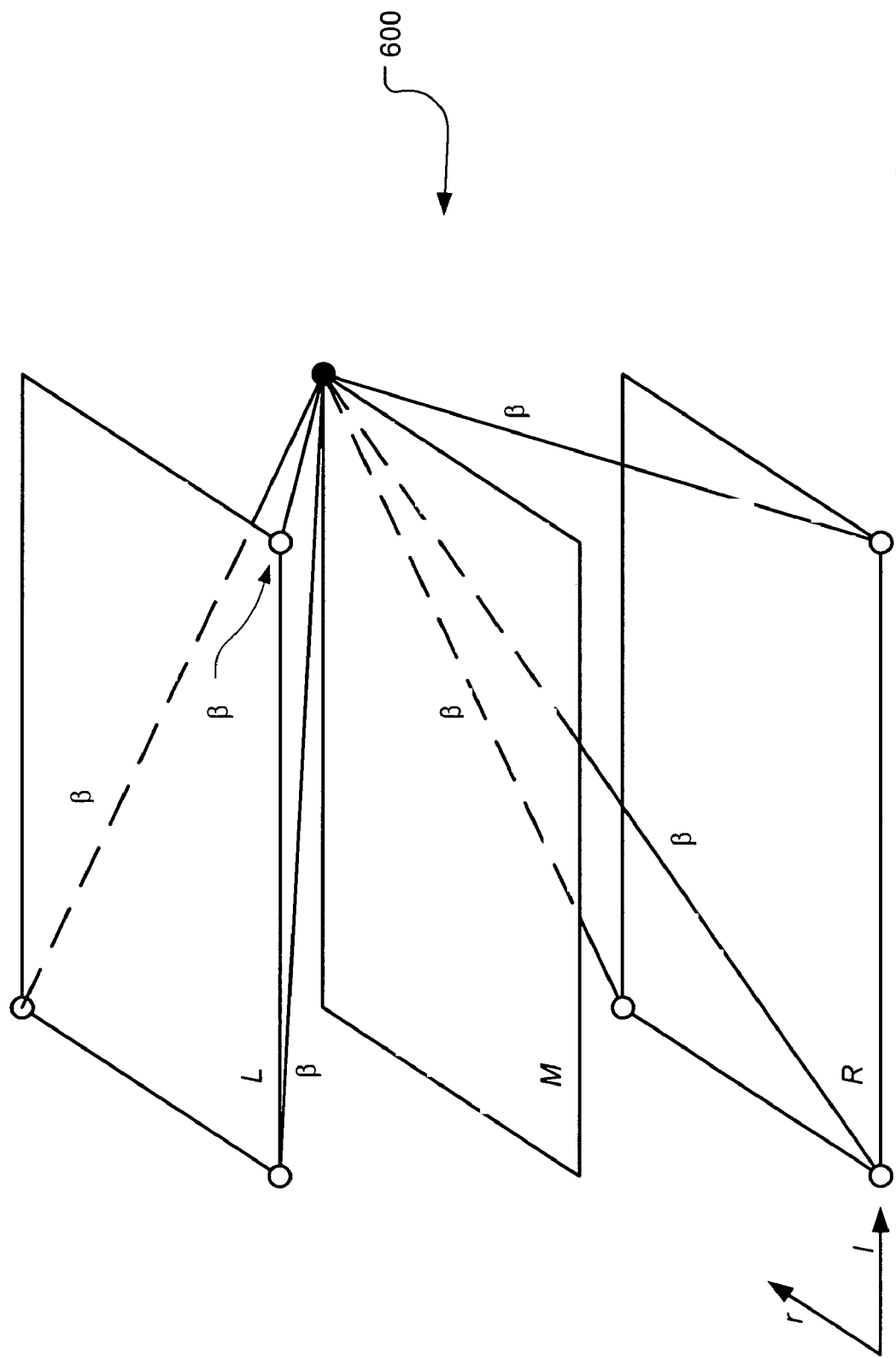
Figure 7:
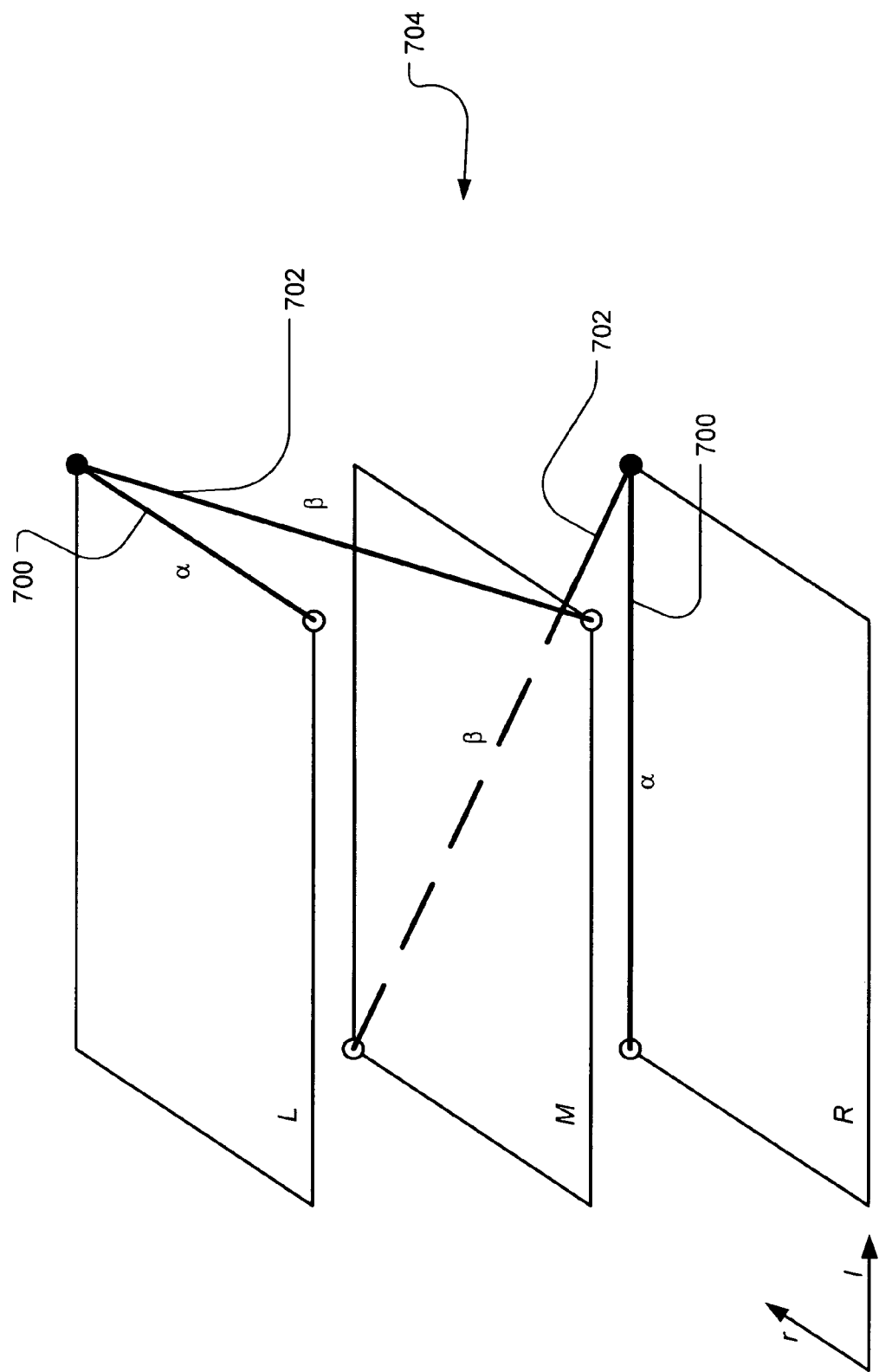
Figure 8:
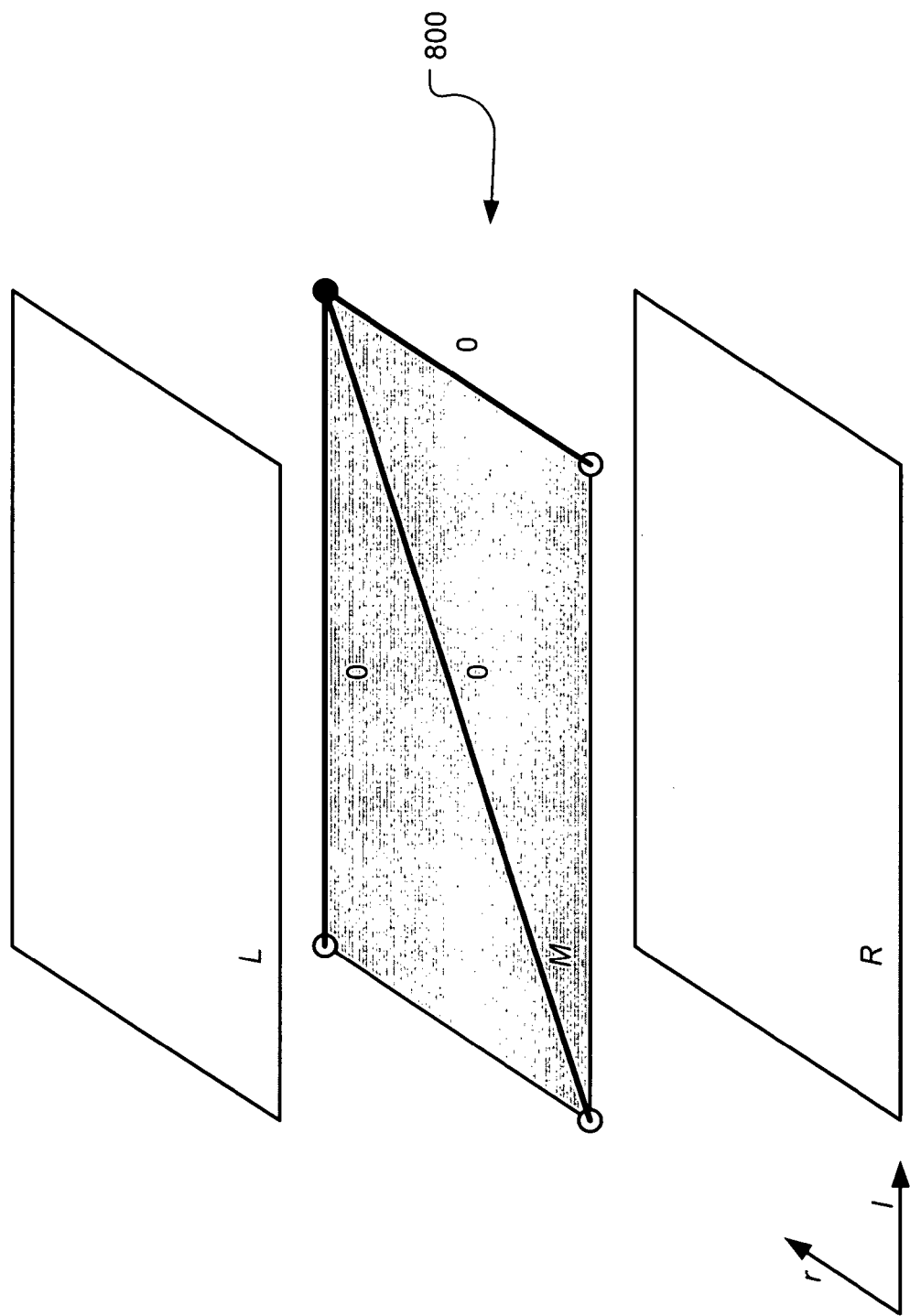

FIGS. 6, 7, and 8 combine to represent an exemplary three-plane representation of the five-move disparity model.

Figure 9:
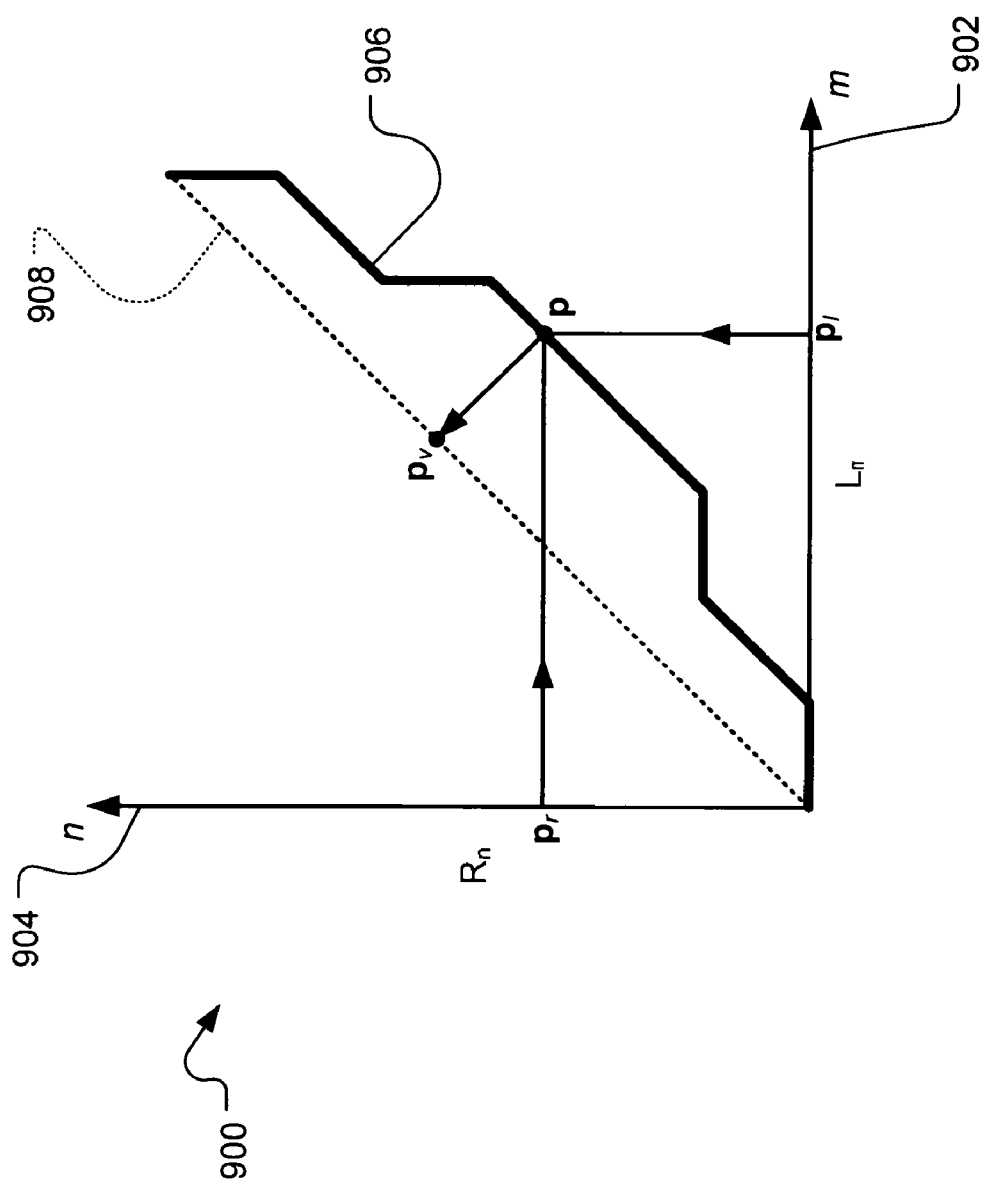

FIG. 9 illustrates an exemplary stereo disparity graph for matched points.

Figure 10:
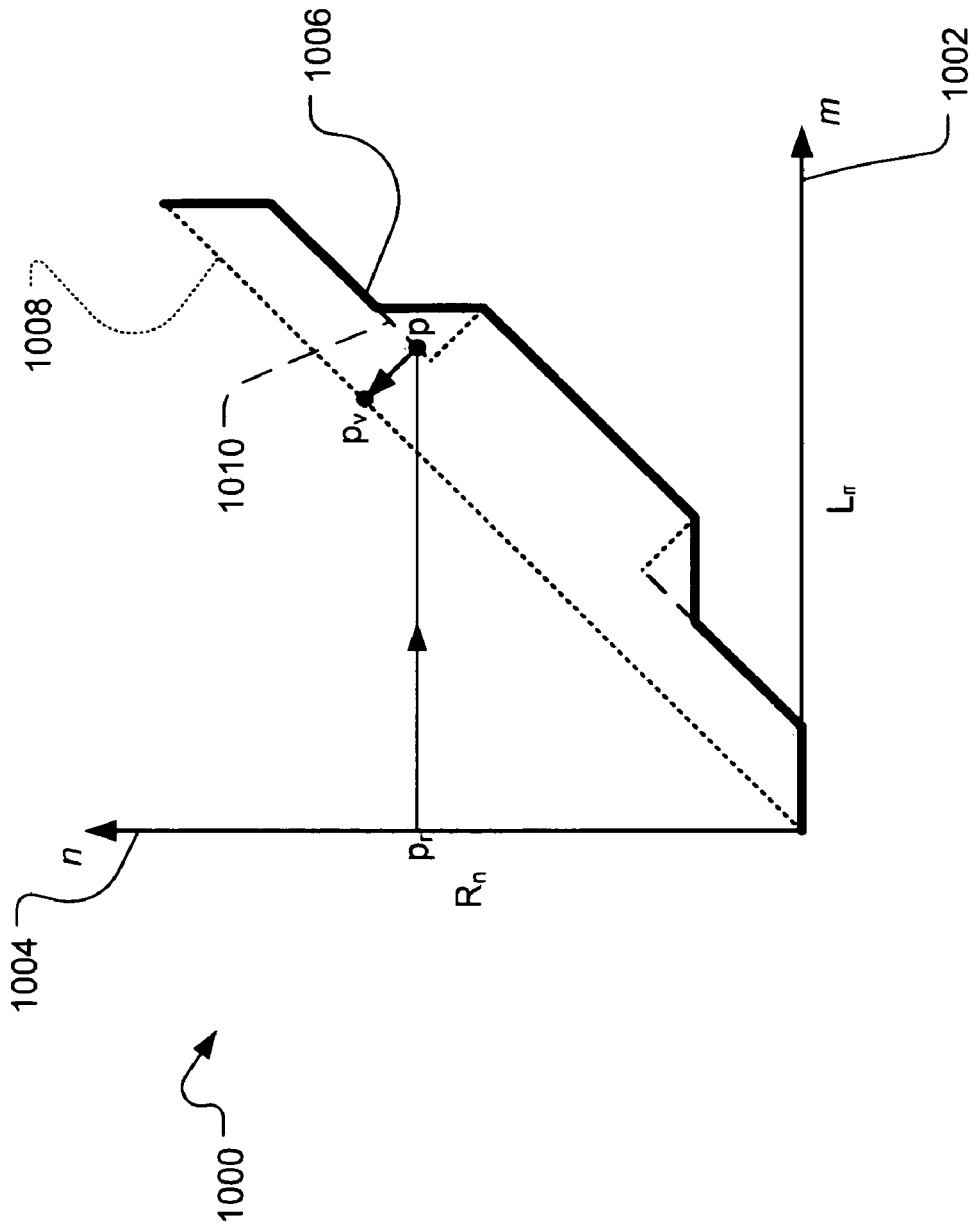

FIG. 10 illustrates an exemplary stereo disparity graph for occluded points.

Figure 11:
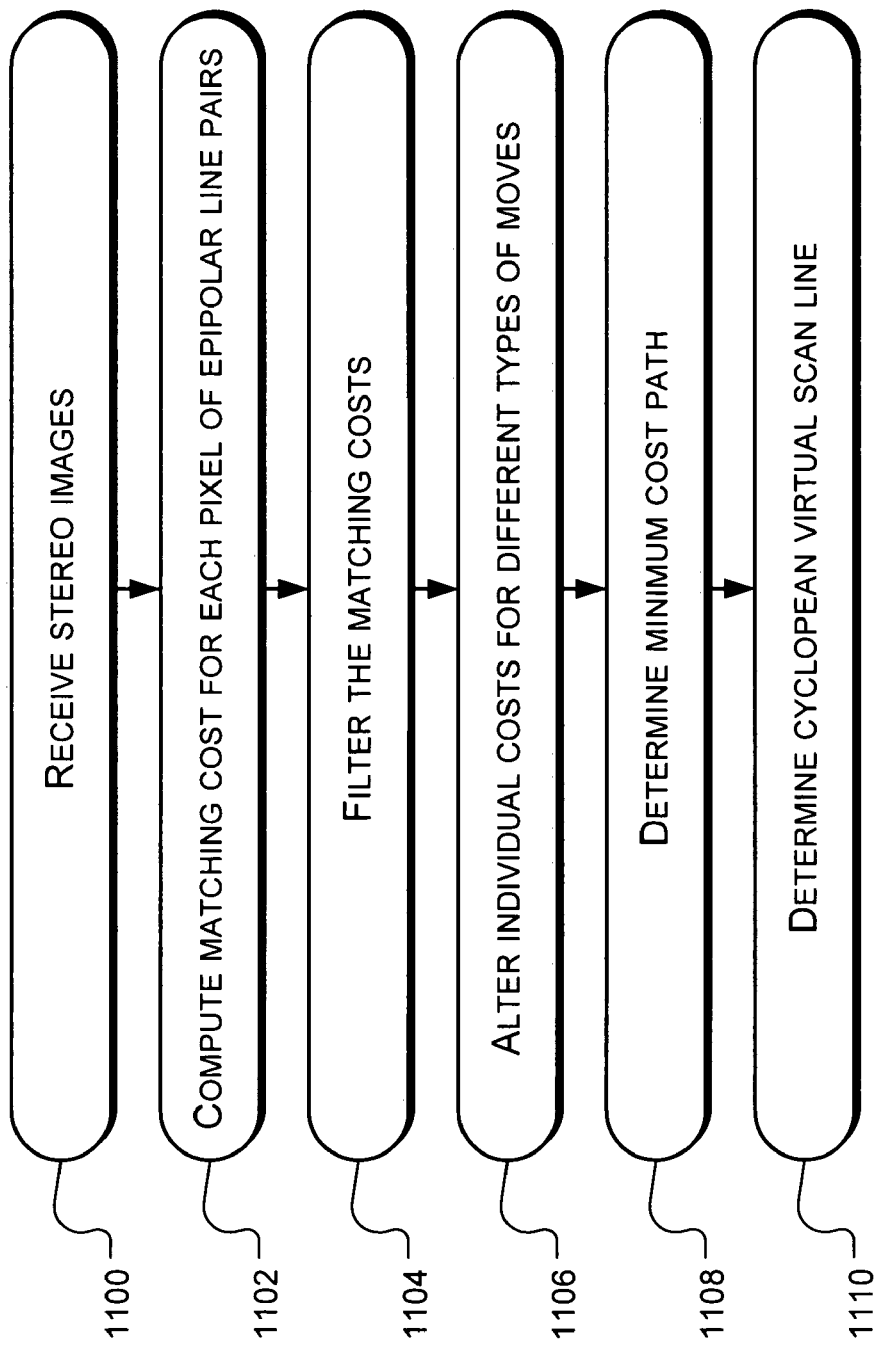

FIG. 11 illustrates exemplary operations for performing gaze manipulation.

Figure 12:
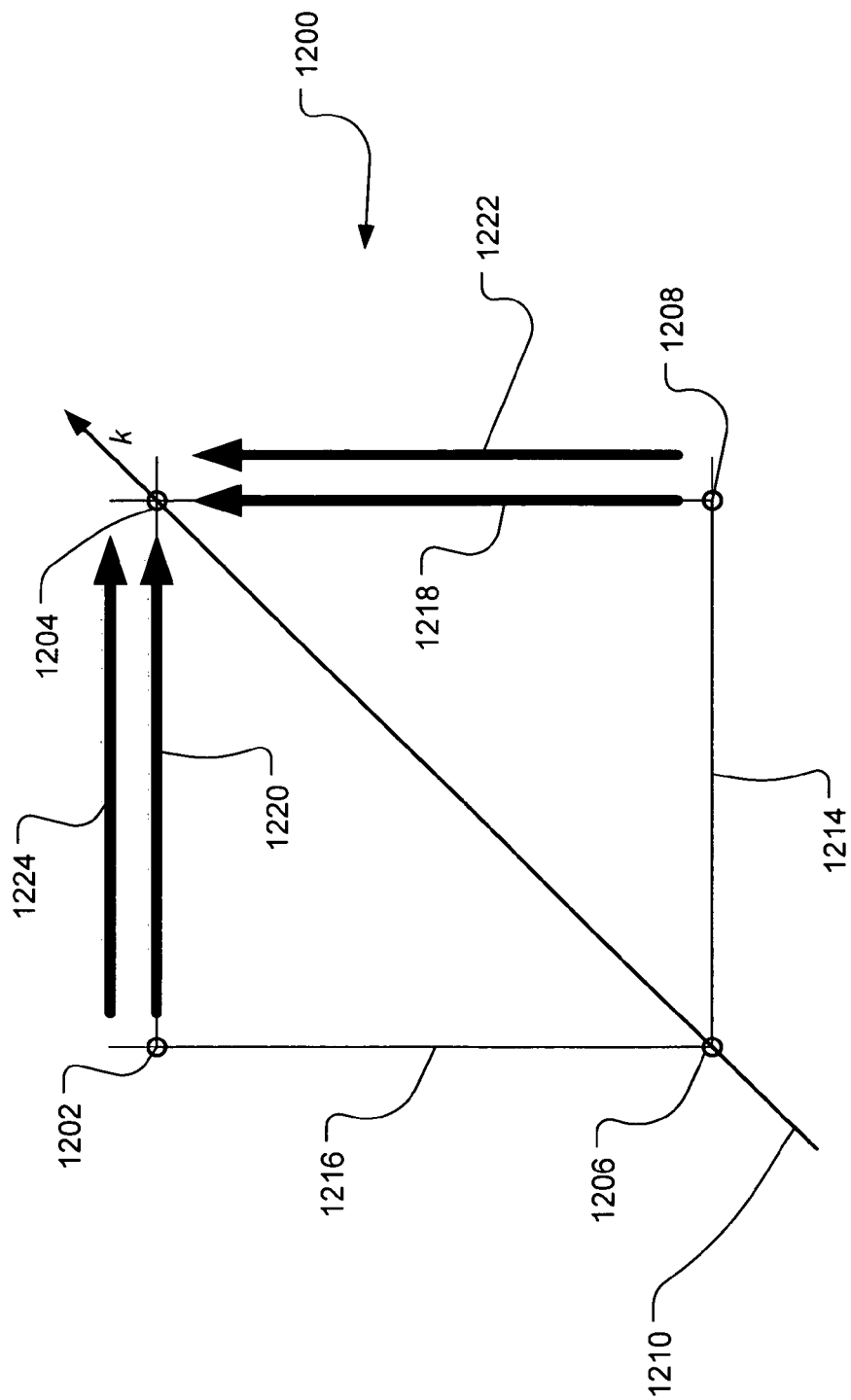

FIG. 12 illustrates an exemplary four-move disparity process model.

Figure 13:
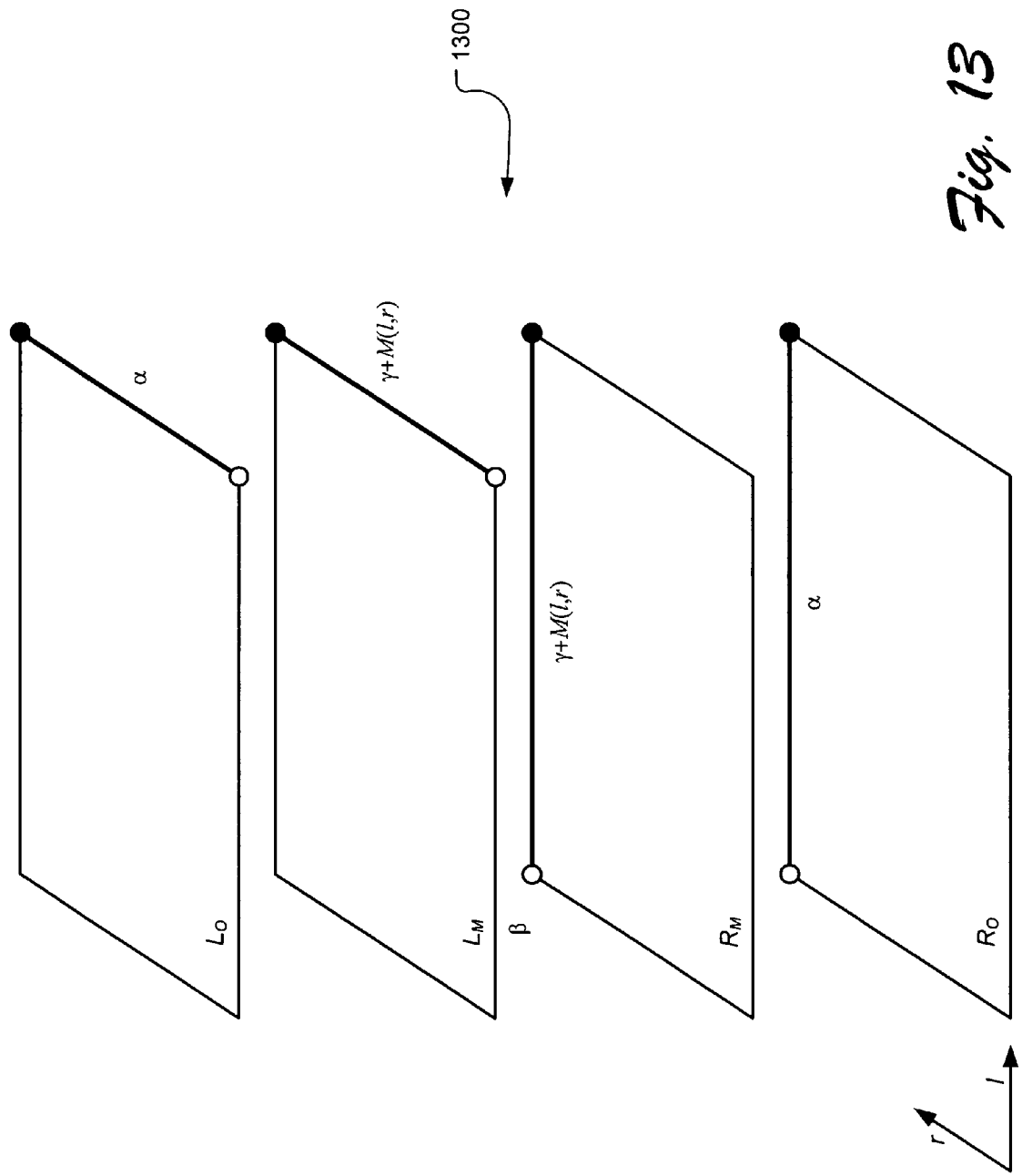
Figure 14:
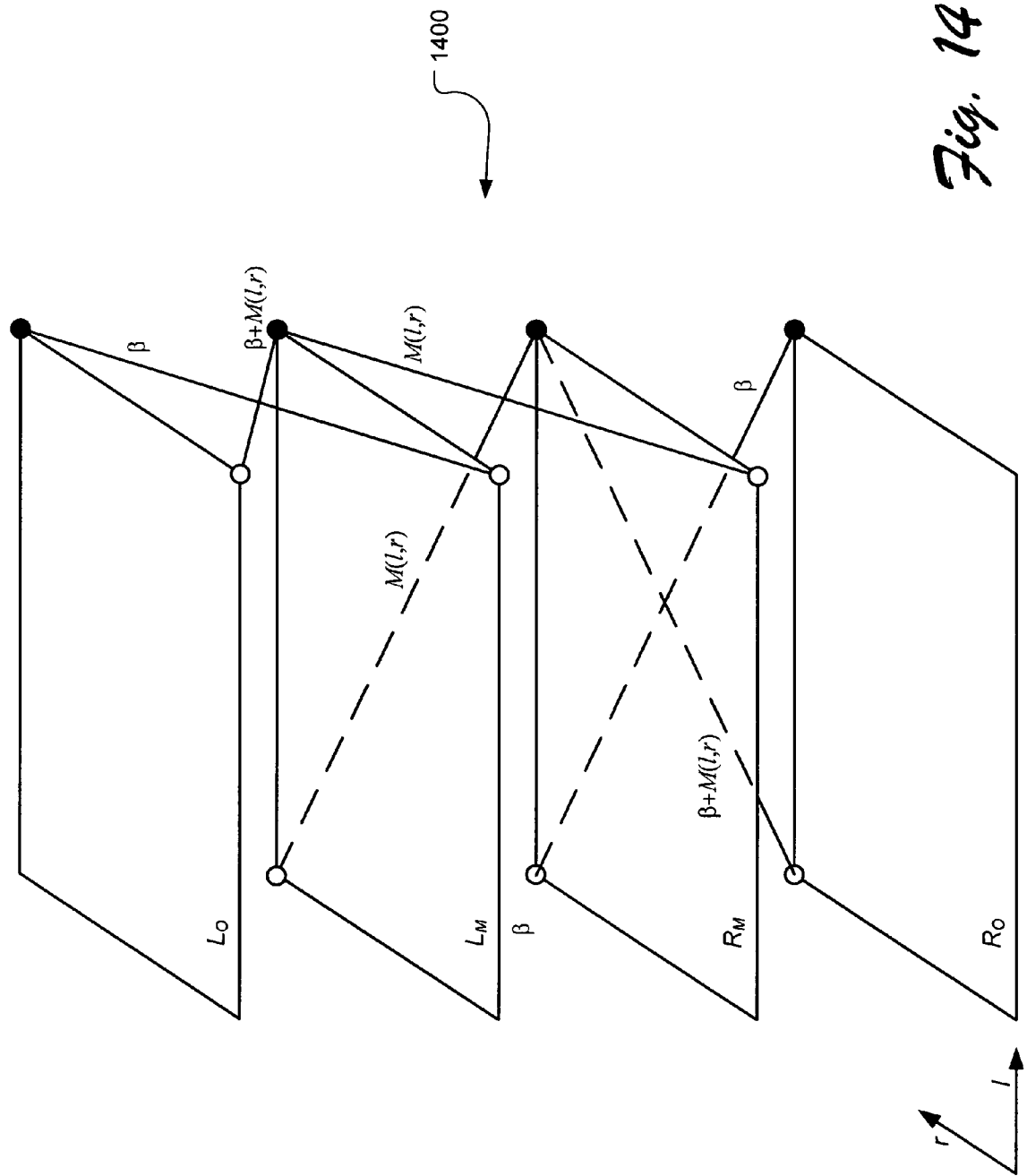
Figure 15:
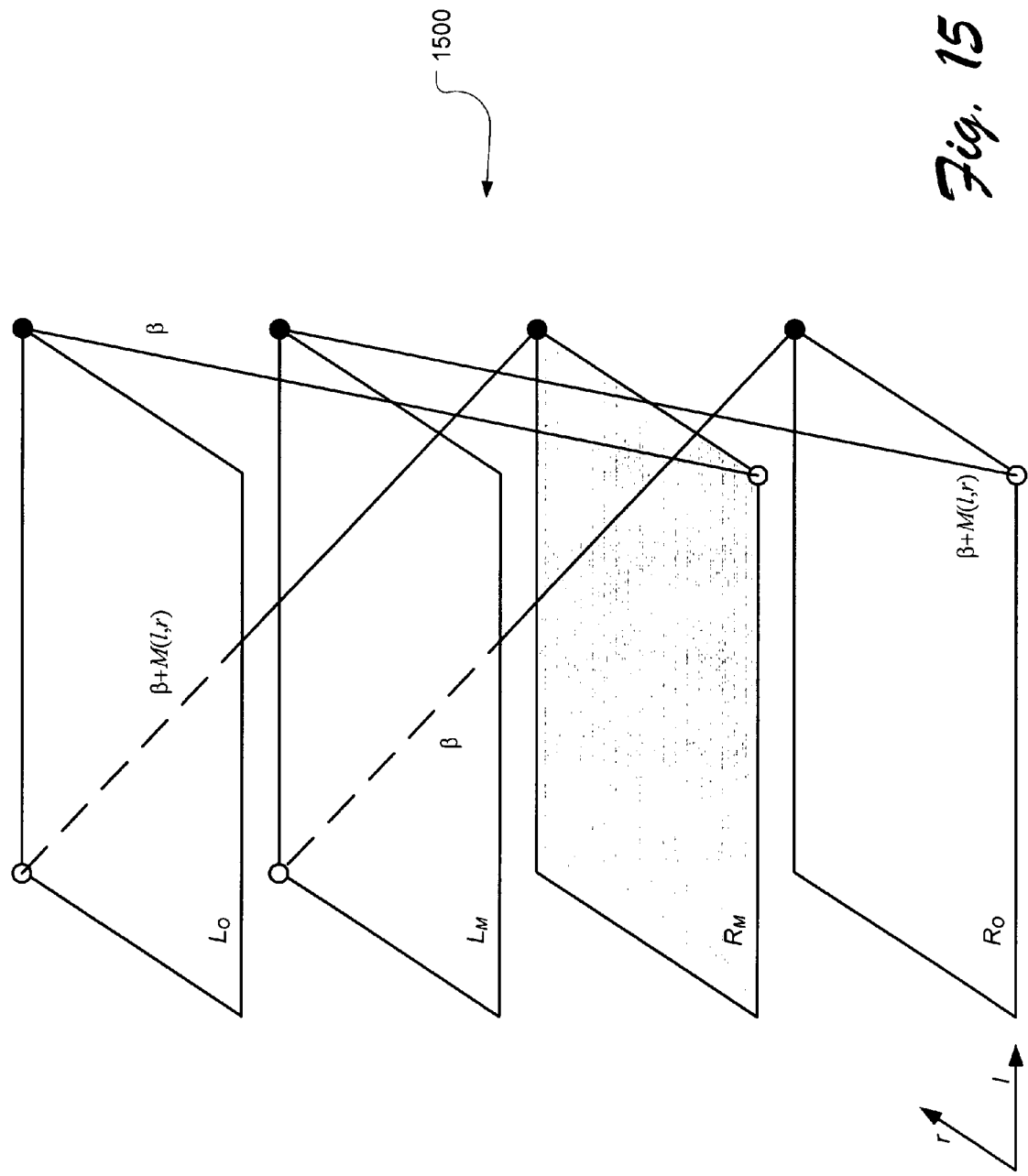

FIGS. 13, 14, and 15 combine to represent a four-plane representation of the four-move disparity model.

Figure 16:
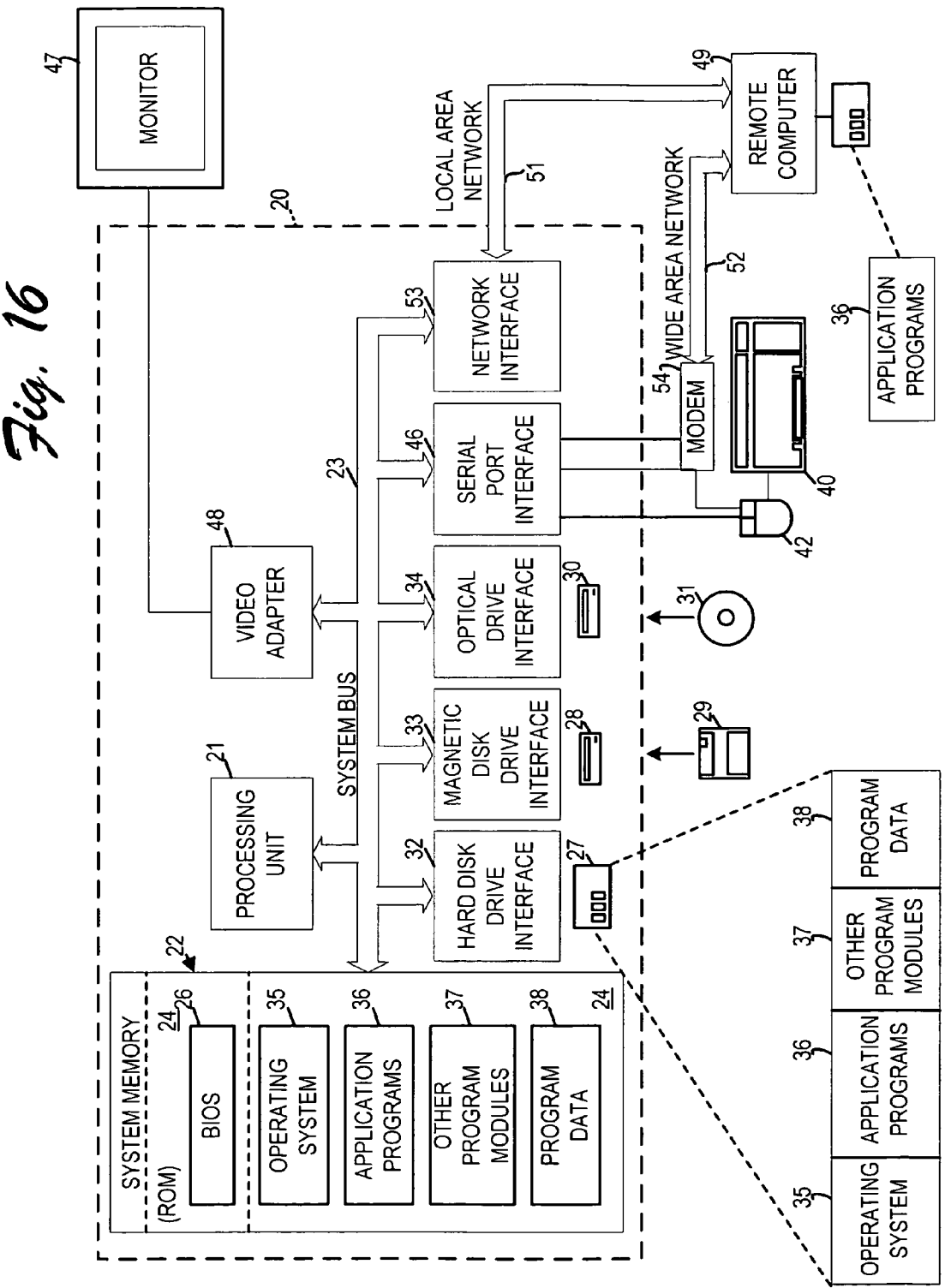

FIG. 16 illustrates an exemplary system useful for implementing an embodiment of the present invention.

Figure 17:
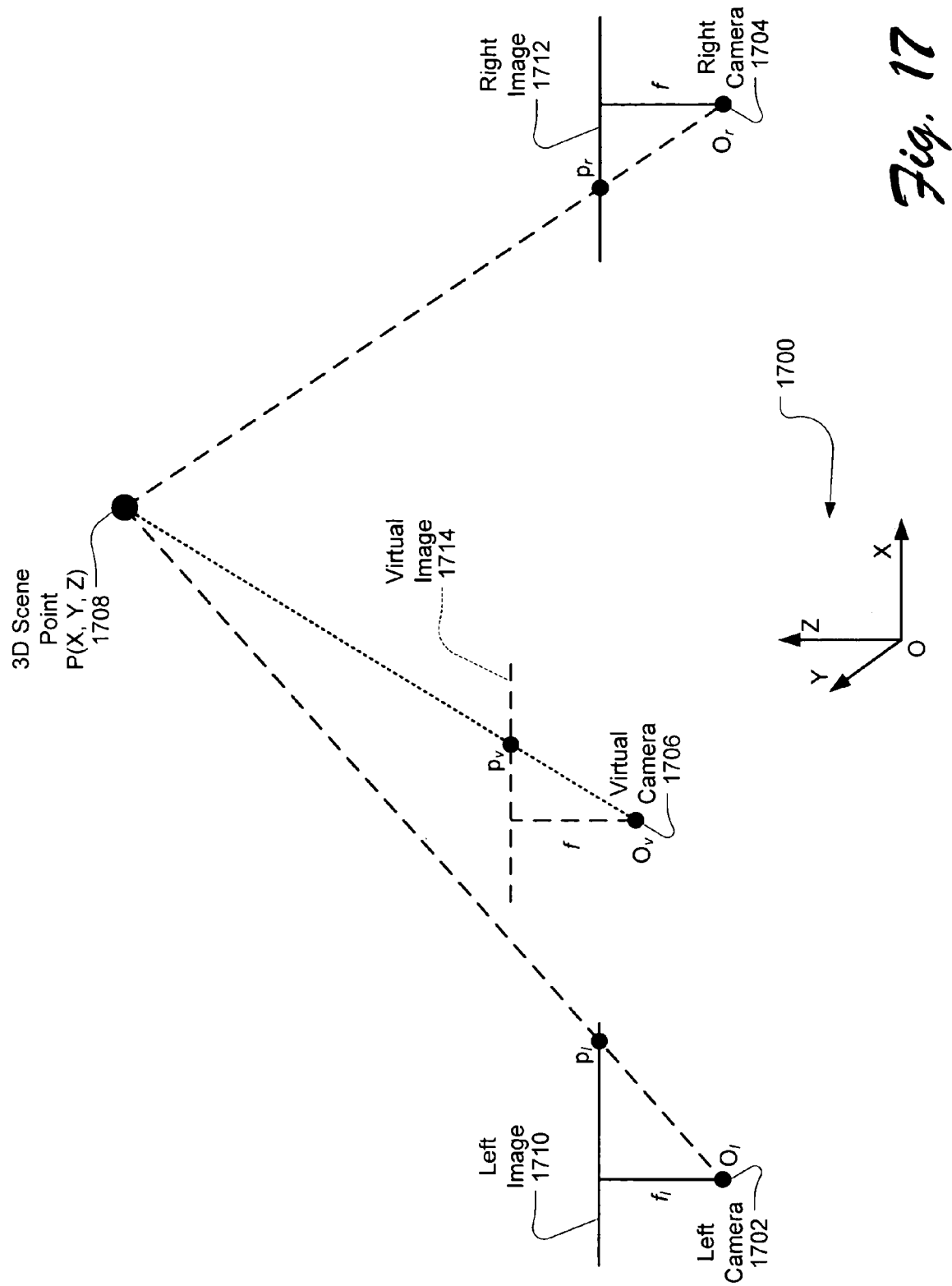

FIG. 17 illustrates notation useful in describing three dimensional translation of a virtual camera.

Figure 18:
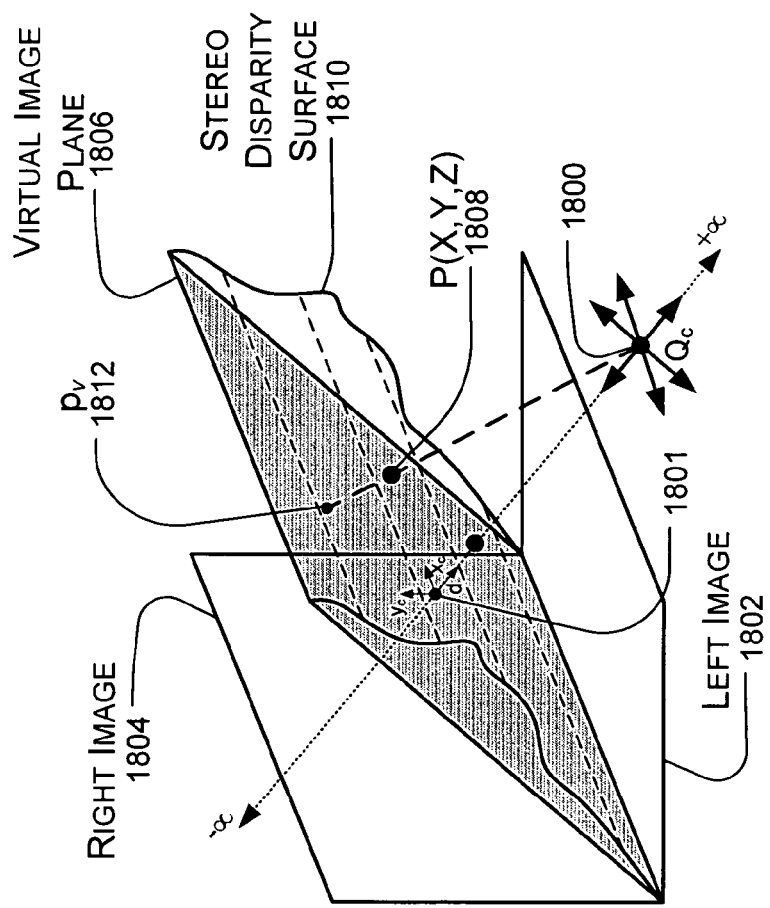

FIG. 18 illustrates exemplary translation of a virtual camera in accordance with movement of a center of projection Q.

Figure 19:
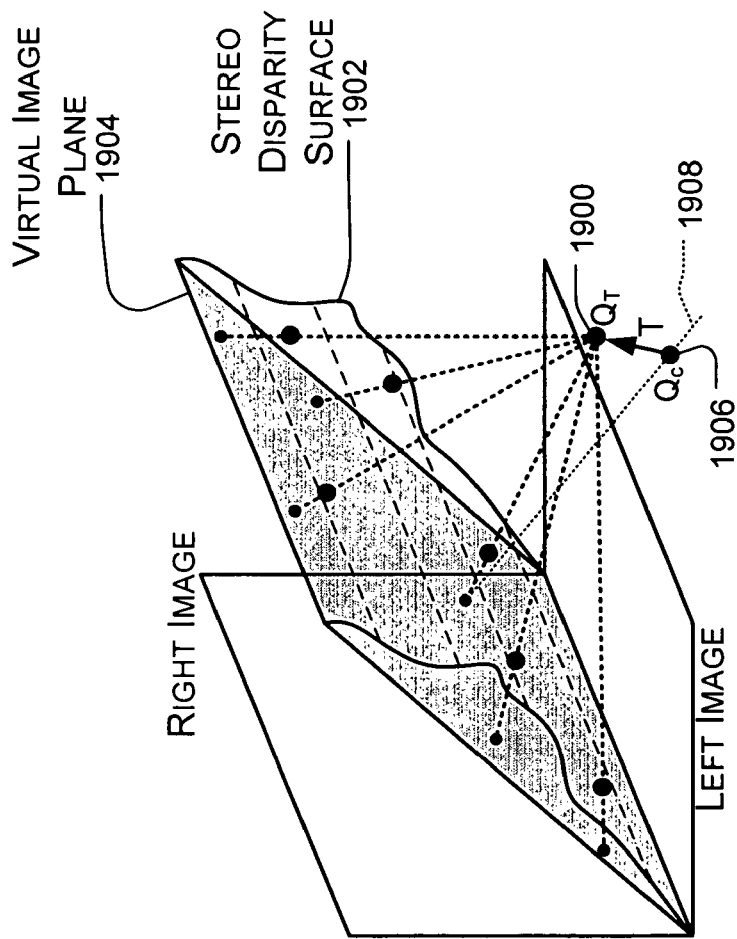

FIG. 19 illustrates exemplary projection of a translated virtual camera projection point through a stereo disparity surface onto a virtual image plane.

Figure 20:
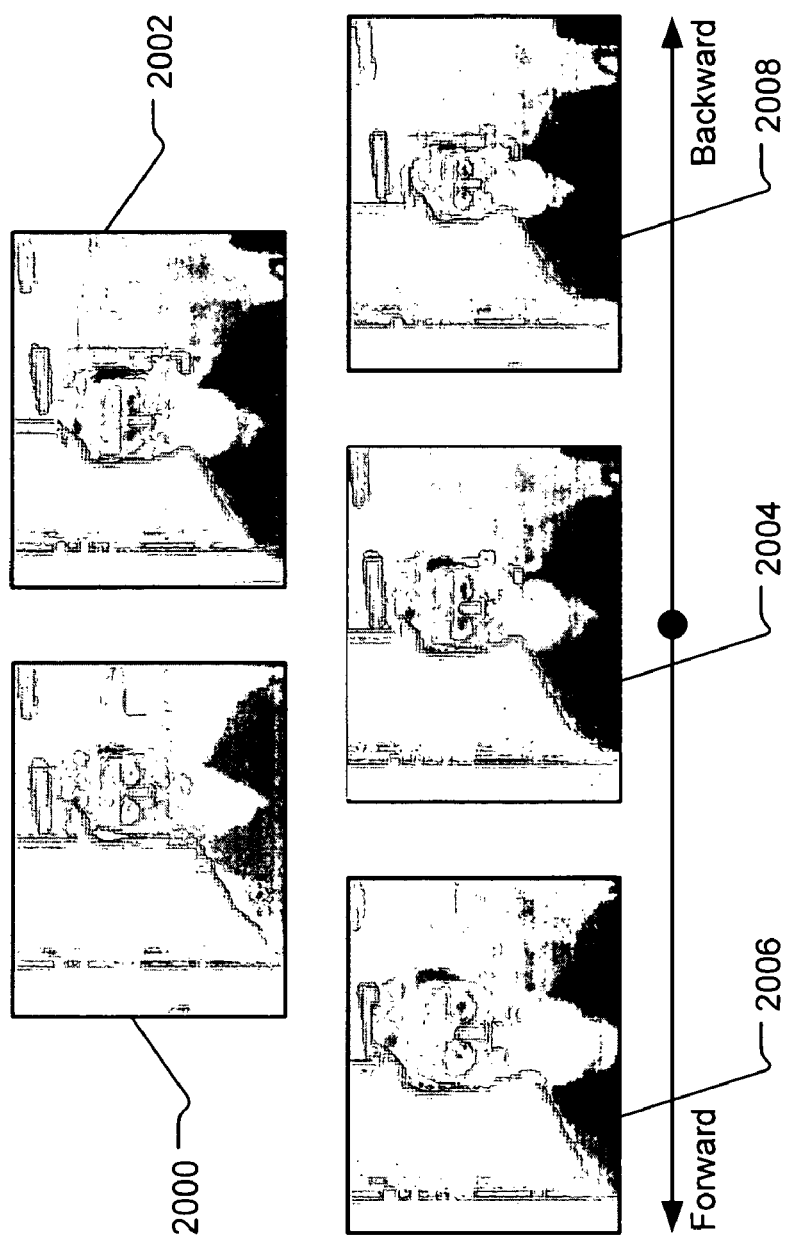

FIG. 20 illustrates results of exemplary forward/inverse translation of a virtual camera.

Figure 21:
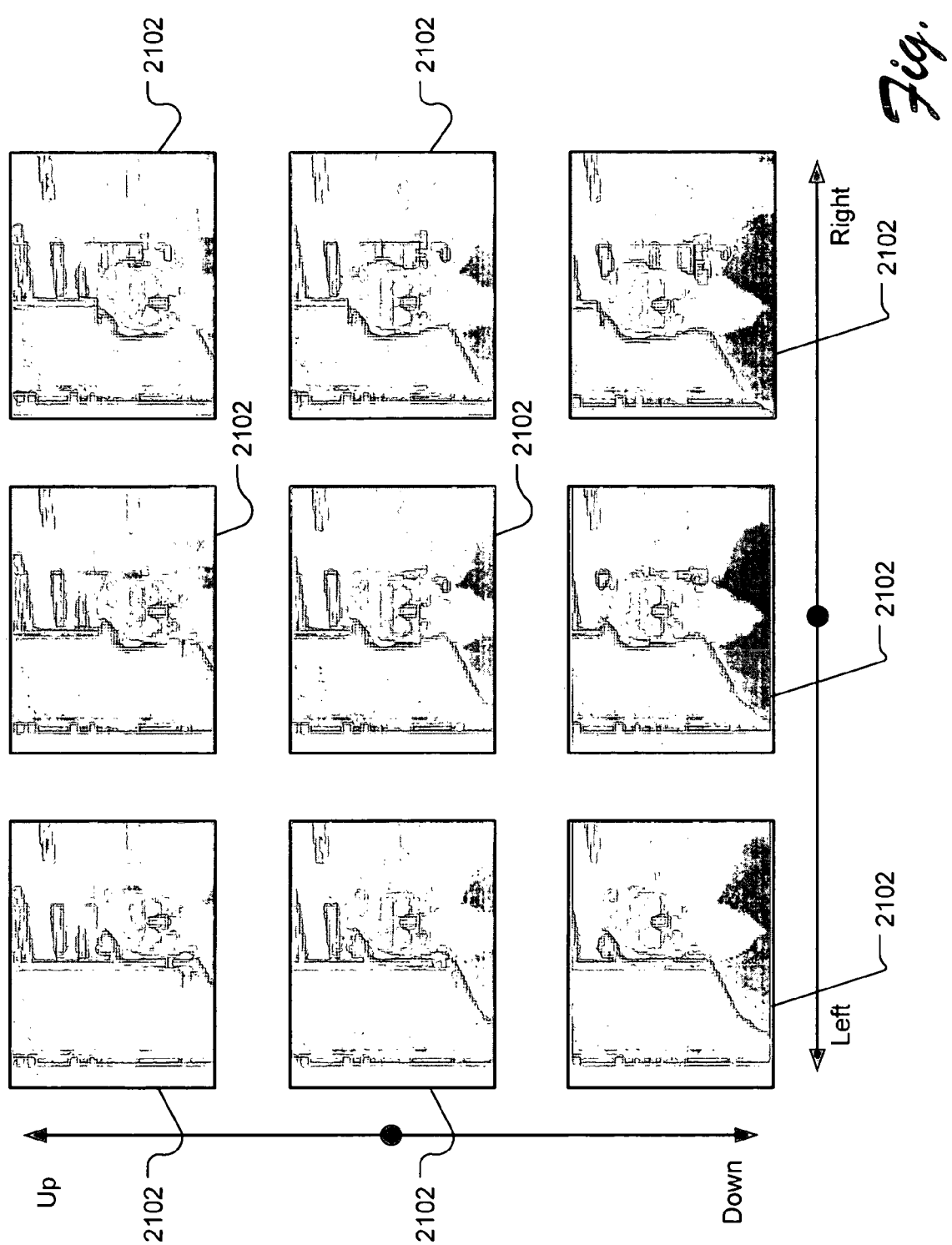

FIG. 21 illustrates results of exemplary in-plane translation of a virtual camera.

Figure 22:
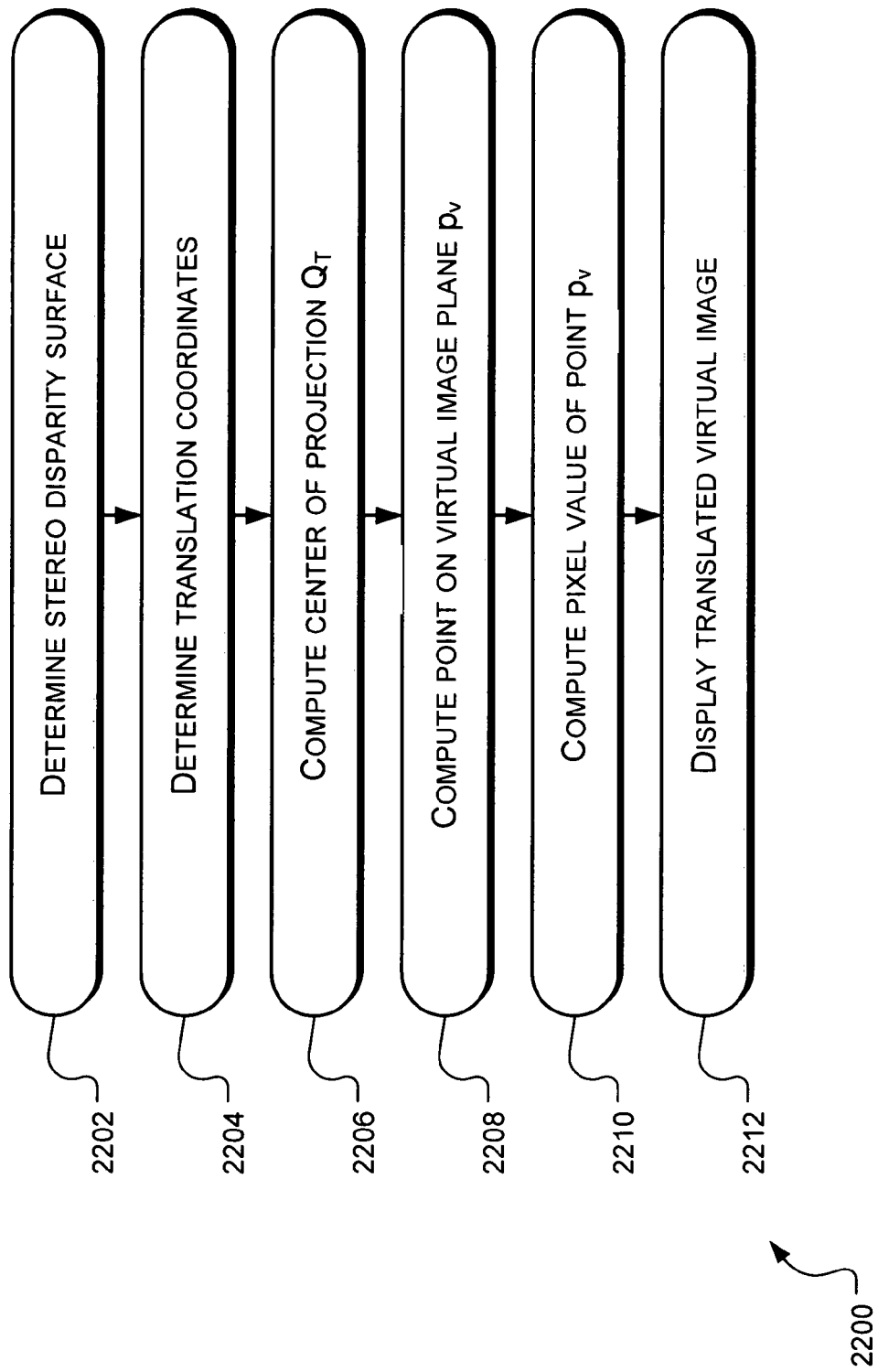

FIG. 22 illustrates exemplary operations for translating a virtual camera in multiple dimensions.

Figure 23:
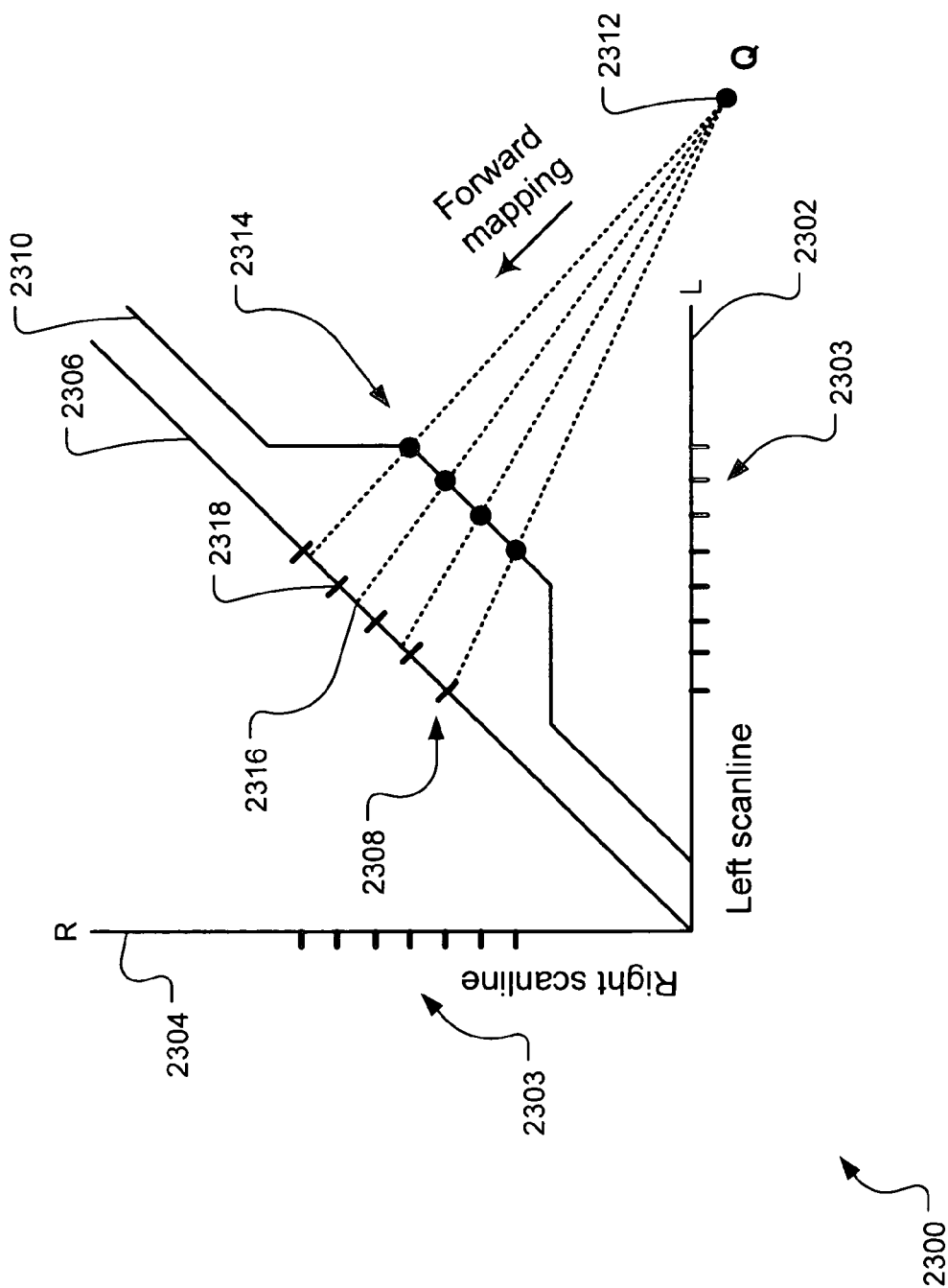

FIG. 23 illustrates an exemplary forward mapping relative to a minimum cost path.

Figure 24:
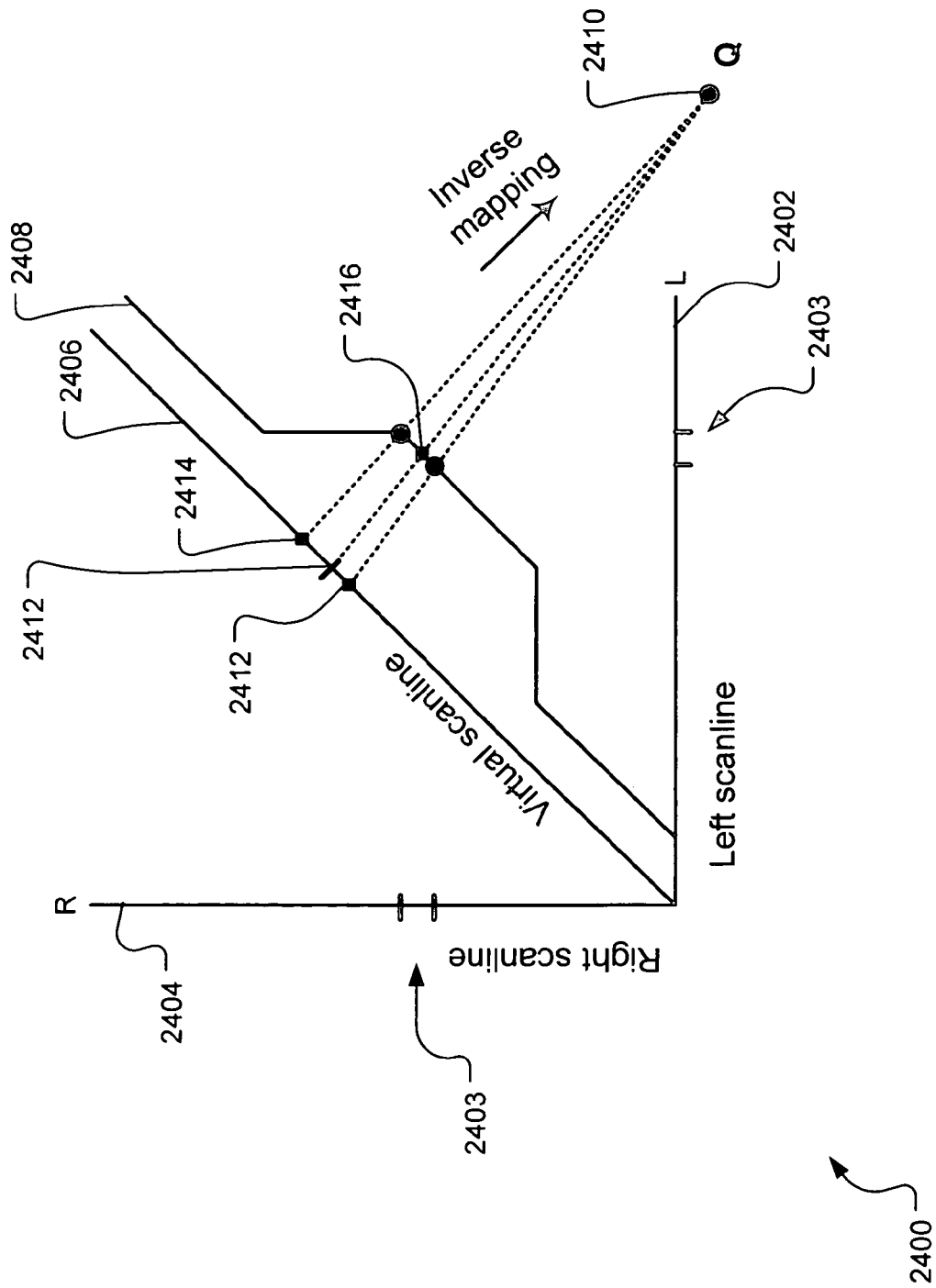

FIG. 24 illustrates exemplary inverse mapping relative to a minimum cost path.

Figure 25:
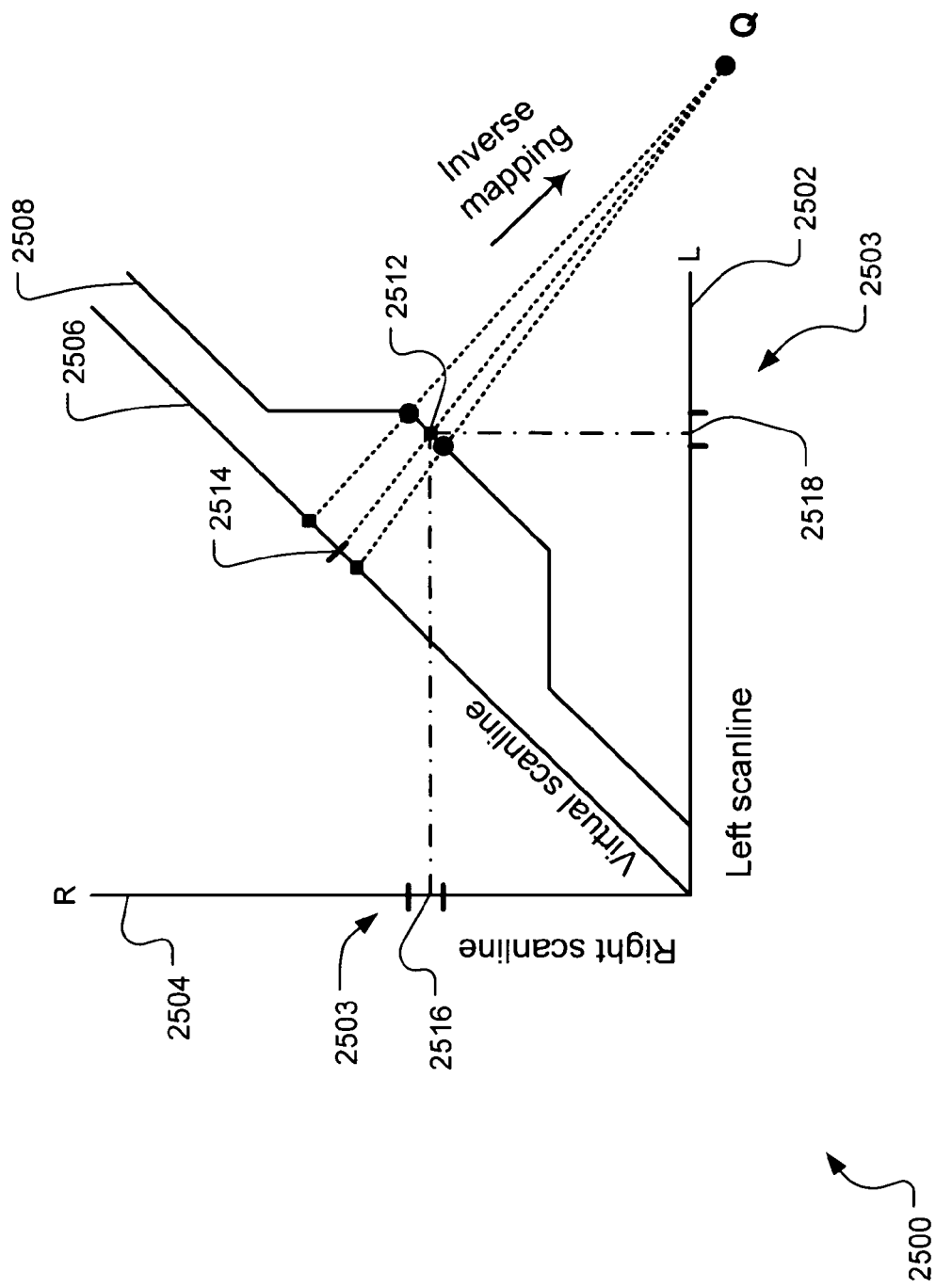

FIG. 25 illustrates exemplary bilinear interpolation.

A multi-layer graph for dense stereo dynamic programming can improve synthesis of cyclopean virtual images by distinguishing between stereo disparities caused by occlusion and disparities caused by non-fronto-parallel surfaces. In addition, cyclopean virtual image processing may be combined with simulation of three-dimensional translation of a virtual camera to assist in aligning the user's gaze with the virtual camera. Such translation may include without limitation one or more of the following: horizontal (e.g., left and right) translation of the virtual camera, vertical translation (e.g., up and down) of the virtual camera, and axial translation (e.g., toward the subject and away from the subject) of the virtual camera.

Figure 1:
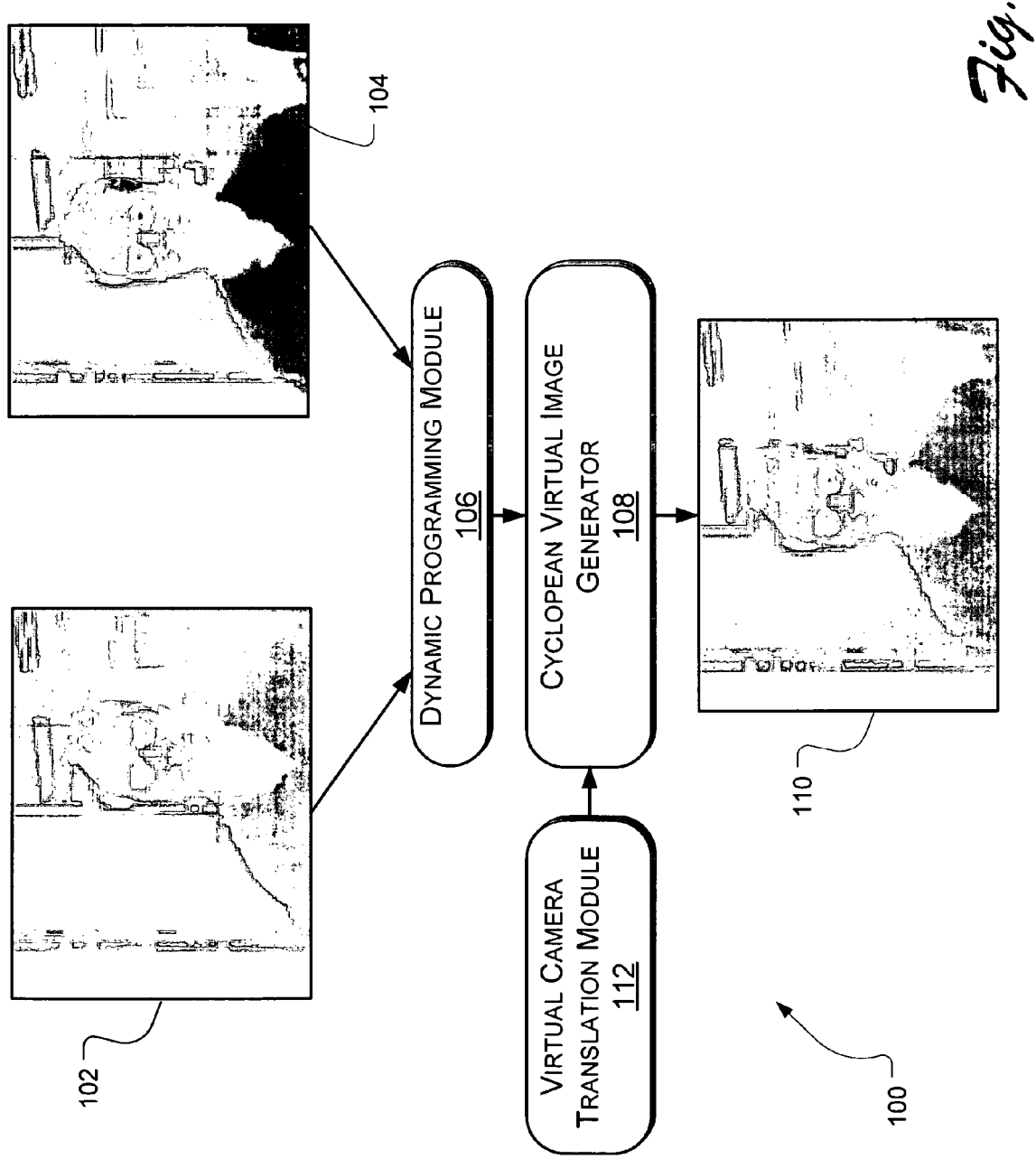
FIG. 1 illustrates an exemplary system for generating a cyclopean virtual image with gaze manipulation.

FIG. 1 illustrates an exemplary system 100 for generating a cyclopean virtual image with gaze manipulation. In the system 100, a left image 102 is captured by a camera mounted on the right side of the video display, as seen by the user. Likewise, a right image 104 is captured by a camera mounted on the left side of the video display, as seen by the user. As such, in both images, the user can be seen looking into the video display, as opposed to looking directly at one of the cameras. The left and right images 102 and 104 are input to a dynamic programming module 106, which generates a stereo disparity graph for each corresponding pair of epipolar lines of the images 102 and 104. In the illustrated implementation, a three-plane model for the dynamic programming is used, although other graphs may be employed, such as a four-plane model, etc.

The stereo disparity graph generated by the dynamic programming module is input to a cyclopean virtual image generator 108, which uses pixel characteristics of corresponding pixels associated with a stereo disparity path, such as a minimum cost path, in the stereo disparity graph to generate the cyclopean virtual image 110 with gaze correction. As a result, the cyclopean virtual image 110 shows the user as appearing to look directly into the camera.

Furthermore, in one implementation, the cyclopean virtual image 110 may be moved to various locations within the display screen while maintaining the alignment with user's gaze. A virtual camera translation module 112 can influence the combination of the left and right images 102 and 104 in such a manner that the virtual camera appears to move in accordance with the user's video display window. Likewise, the virtual camera can also appear to be brought closer or farther away from the subject through influence of the virtual camera translation module 112 (see the descriptions regarding FIGS. 17-22 for additional information).

Figure 2:
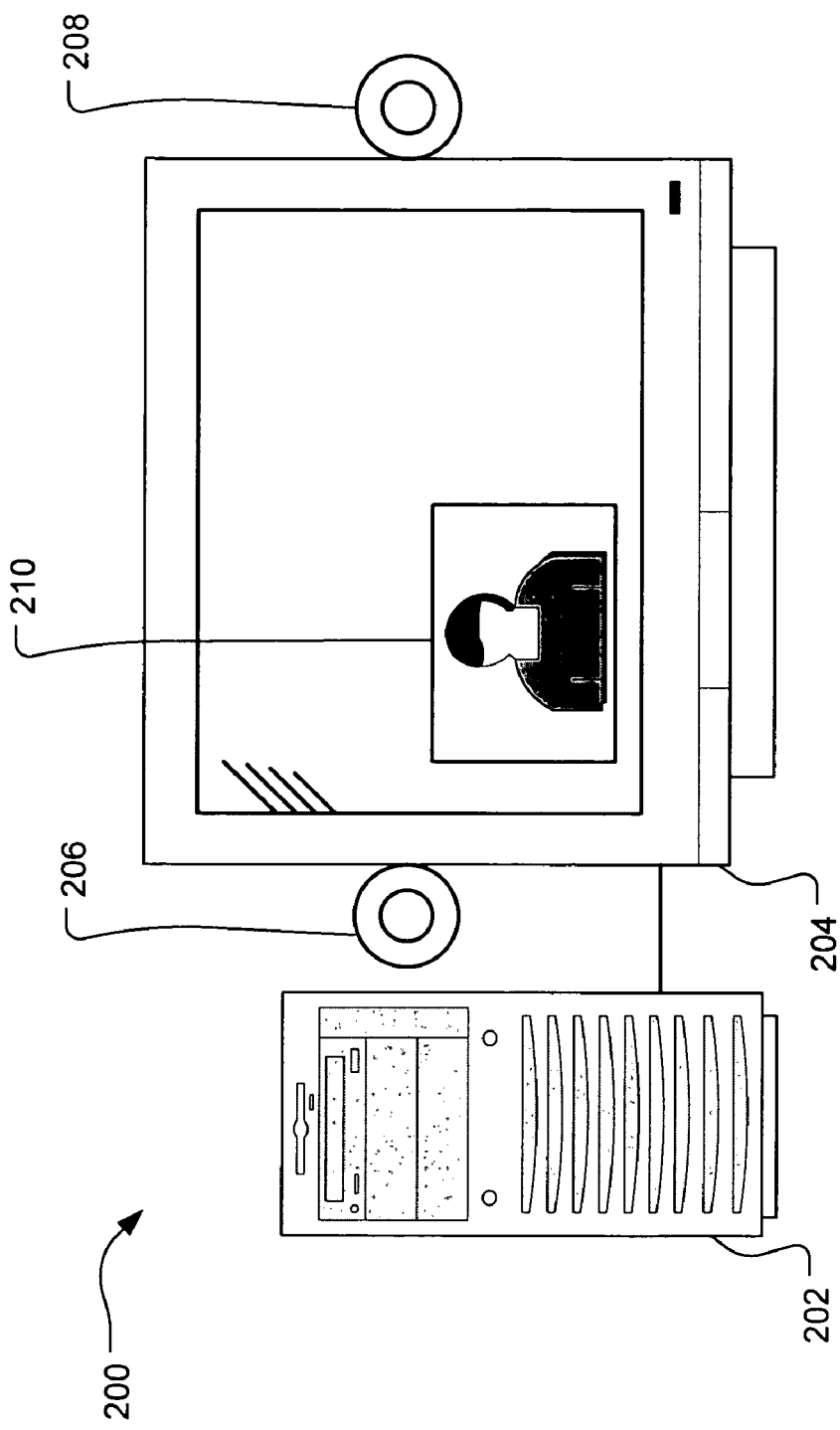
FIG. 2 illustrates an exemplary video conferencing system configuration 200 for generating a cyclopean virtual image with gaze manipulation.

FIG. 2 illustrates an exemplary video conferencing system configuration 200 for generating a cyclopean virtual image with gaze manipulation. A computer system 202 is coupled to a video display 204 having two cameras 206 and 208 mounted on either side of the video display 204. A video window 210 displays a remote participant on the other end of the video conference session.

In a configuration having only a single camera, the user typically focus his or her eyes on the video window 210, while the single camera captures images of the user from one side of the other. As such, the captured images sent to the remote participant are primarily a side view of the user's head, not a straight-on view of the user's face. The illustrated configuration, however, allows generation of a cyclopean virtual image from the captured left and right images of the user. It should be understood that cyclopean refers to the single virtual image. Furthermore, in one implementation, the cyclopean virtual image may be displayed at different video window locations on the display screen (i.e., is not limited to a central orientation relative to the stereo cameras) while maintaining alignment of the virtual camera with the user's gaze. Likewise, axial translation of the virtual image may also be achieved in an implementation.

The cyclopean virtual image generation synthesizes the cyclopean virtual image from a stereo disparity graph representing the disparity field between corresponding left and right images. Furthermore, the dynamic programming applied to the disparity graph distinguishes between disparities caused by occlusion and disparities caused by non-fronto-parallel surfaces (e.g., slanted) in the view field.

It should be understood that more than two cameras may also be used to generate a cyclopean virtual image. Likewise, the cameras may be in alternative orientations, such as at the top and bottom of the video display. For example, one configuration may include four cameras, each placed at a corner of the video display.

The cyclopean virtual image $\mathbf{l}$ is synthesized from intensity functions $\mathbf{L}=\{L_m, m=0, \ldots, N\}$ and $\mathbf{R}=\{R_n, n=0, \ldots, N\}$, which represent epipolar lines (or scan lines) of observed (i.e., captured) left and right images. A matched pair $(L_m, R_n)$ has "stereo disparity" of $d=n-m$, which may be considered a measure of "parallax". In one implementation, each image contains color pixels in three color channels, such that $L_m$, $R_n \in \Re$. In a more general setting, however, there may be other features, such that $L_m$, $R_n \in \Re^f$, if where f is an integer. For example, groups of pixels may be filtered to obtain improved invariance to illumination variations or non-uniform camera sensitivities.

A cyclopean epipolar line (i.e., the corresponding scan line in the virtual cyclopean image) is represented by $\mathbf{l}=\{I_k, k=0, \ldots, 2N\}$. The cyclopean virtual image $\mathbf{l}$ is constructed from a set of cyclopean epipolar lines stacked line-by-line to form the resulting cyclopean image.

Figure 3:
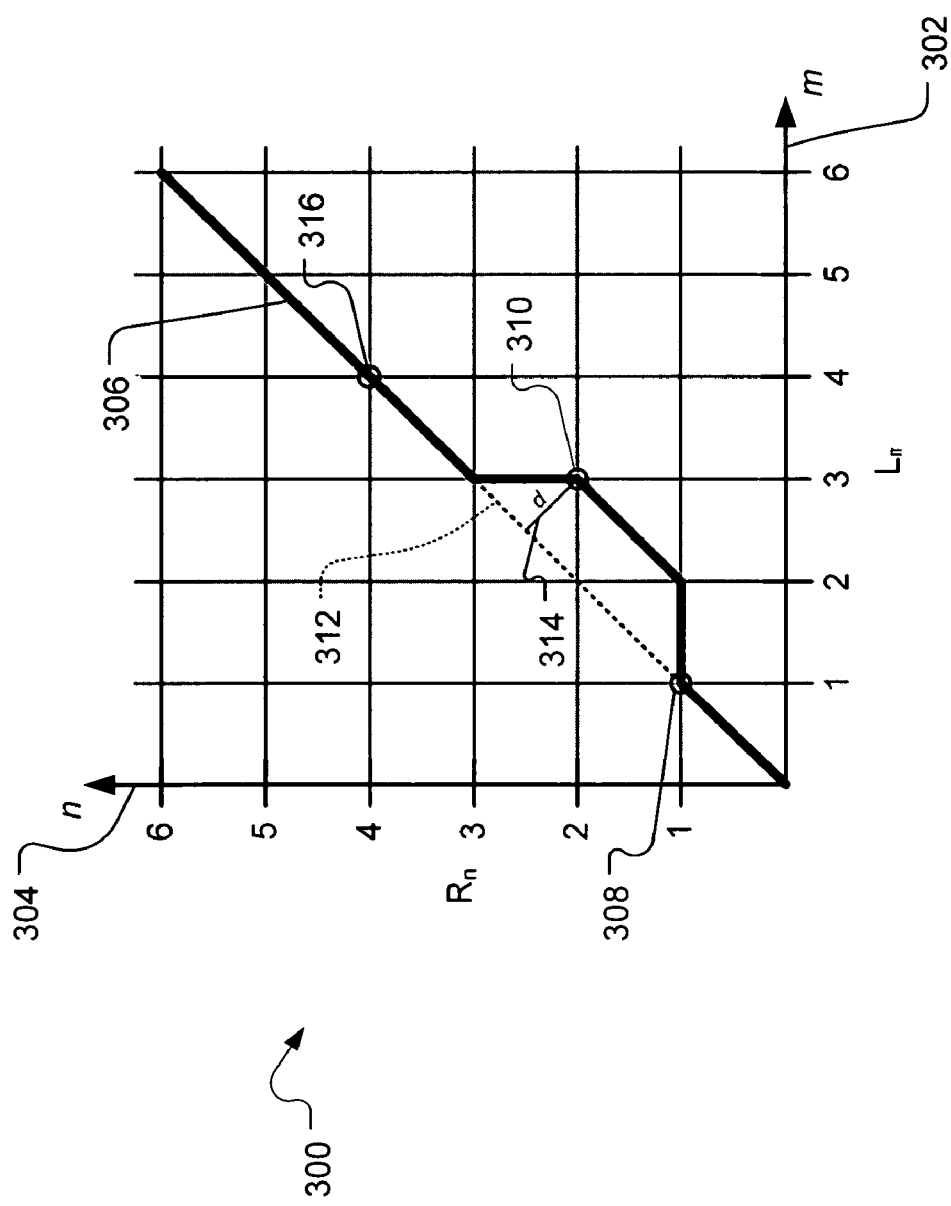
FIG. 3 illustrates stereo disparity as a function of left and right epipolar lines L and R, which are defined in terms of pixel coordinates m and n, respectively.

FIG. 3 illustrates stereo disparity as a function of left and right epipolar lines L and R, which are defined in terms of pixel coordinates m and n, respectively. The stereo disparity between the left and right stereo images is defined as a vector $d=\{d_k, k=0, \ldots, 2N\}$ having components expressed in cyclopean coordinates k.

A diagram 300 shows an axis 302, representing a sequence of positions along a left epipolar line L, and another axis 304 representing a sequence of positions along a right epipolar line R. A minimum cost path 306 indicates matches between pixels in given sequential positions in L with pixels in given sequential positions in R. For example, pixel 1 of L matches pixel 1 of R, as shown by point 308. In contrast, pixel 3 of L matches pixel 2 of R, as shown by point 310. The disparity associated with a point 310 on the minimum cost path 306 is defined as the orthogonal distance of the point from a virtual scan line 312 (or zero disparity axis or zero parallax axis). For example, the disparity of the point 308 is zero, whereas the disparity d of the point 310 is shown by line 314. (As suggested by the disparity axis of FIG. 4, the disparity of point 310 is "−1".)

Accordingly, the minimum cost path 306 represents a two-dimensional profile of a scan line of the virtual image, where pixels with a greater absolute value of disparity (e.g., point 310, which has a negative disparity relative to the zero parallax line 312) are closer to the virtual cyclopean camera—e.g., the video subject—than pixels with a lower absolute value of disparity (e.g., point 316, which has a zero disparity relative to the zero parallax line 312), which are deemed farther away from the virtual cyclopean camera—e.g., the background. Stacking a set of these two-dimensional profiles, which correspond to individual cyclopean epipolar lines, can yield a three-dimensional profile surface of the image subject.

A matching cost function may be used to determine the minimum cost path in a stereo disparity graph. A variety of matching cost functions may be employed to compute the matching two pixels. However, using some traditional techniques, processing individual epipolar line pairs independently can cause visible "streaky" artifacts in the output disparity graph. Therefore, by using neighborhood windows in computing the cost of matching two pixels, the "independence" of the scan lines can be compromised, thereby reducing streaky artifacts.

In one implementation, a windowed Normalized Sum of Squared Differences (SSD) matching function is used to compute the matching cost M(l,r) for every pair of pixels along corresponding epipolar lines:

$$M_{ssd}(l, r) = \frac{M'(l, r)}{2} \quad (1)$$

with $$M'(l, r) = \frac{\sum_{\delta \in \Omega} [(I^l_{p_l+\delta} - \bar{I}^l_{p_l}) - (I^r_{p_r+\delta} - \bar{I}^r_{p_r})]^2}{\sum_{\delta \in \Omega} (I^l_{p_l+\delta} - \bar{I}^l_{p_l})^2 + \sum_{\delta \in \Omega} (I^r_{p_r+\delta} - \bar{I}^r_{p_r})^2} \quad (2)$$

where $\Omega$ is an n×m generic template patch centered at the origin of the coordinate system; $p_l$ and $p_r$ are pixel positions (2-vectors) in the left and right images, respectively; and $\delta$ is a variable 2D displacement vector. The "bar" above a variable (e.g., $\bar{I}$) represents the mean operator.

In FIGS. 6, 7, and 8 combine to represent a 3-plane representation of the 5-move disparity model another implementation, a Normalized Cross-Correlation (NCC) matching cost may be employed:

$$M_{ncc}(l, r) = \frac{1 - M'(l, r)}{2} \quad (3)$$

when $$M'(l, r) = \frac{\sum_{\delta \in \Omega} [(I^l_{p_l+\delta} - \bar{I}^l_{p_l}) - (I^r_{p_r+\delta} - \bar{I}^r_{p_r})]^2}{\sqrt{\sum_{\delta \in \Omega} (I^l_{p_l+\delta} - \bar{I}^l_{p_l})^2 \sum_{\delta \in \Omega} (I^r_{p_r+\delta} - \bar{I}^r_{p_r})^2}} \quad (4)$$

is the correlation coefficient. Other matching cost functions may also be used, including without limitation shiftable window approaches (e.g., using 3×3 pixel windows or larger) or rectangular window approaches (e.g., using 3×7 windows).

Figure 4:
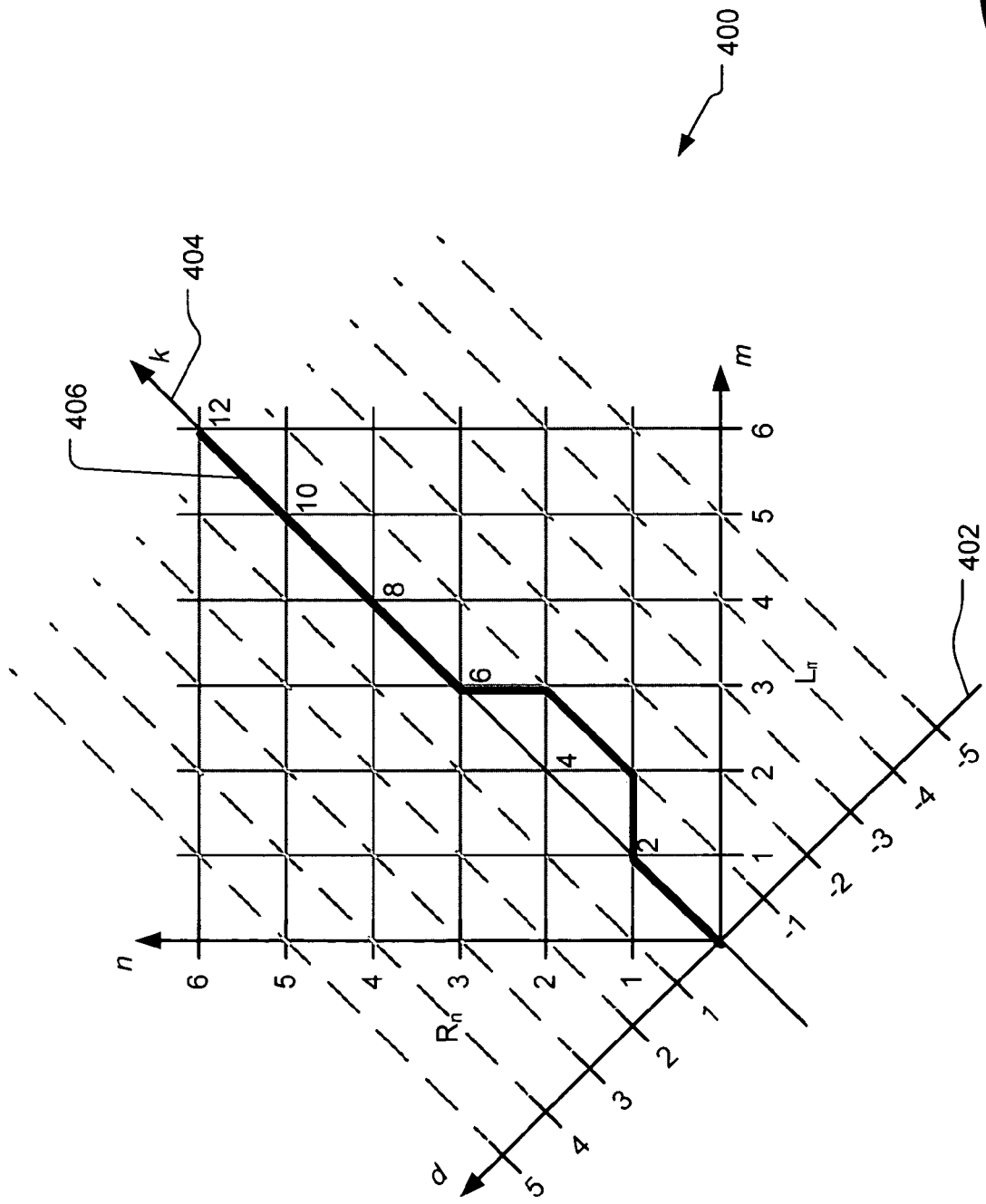
FIG. 4 illustrates disparity and cyclopean axes overlaid on the L and R axes.

FIG. 4 illustrates disparity and cyclopean axes overlaid on the L and R axes to show an exemplary stereo disparity graph 400. Based on the disparity axis 402, a disparity vector d in cyclopean coordinates k along the cyclopean axis 404 can be graphed into the pixel coordinates m and n. The cyclopean coordinate k corresponding to pixel coordinates m and n is computed as k=m+n. The bold line marks the minimum cost path 406 in the stereo disparity graph 400.

Different segments of the minimum cost path 406 represent different characteristics of the stereo images. A diagonal path on the d=0 axis (as seen between k=0 to 2) represents a zero-disparity, linear match between pixels in the epipolar lines of the right and left images. This linear match might happen, for example, when the pixels are of distant objects in which no parallax is evident. In contrast, a diagonal path off of the d=0 axis (as seen between k=3 to 5) represents a disparate (disparity=−1), linear match between pixels in the epipolar lines of the right and left images. In both cases, a diagonal line on the minimum cost path 406 represents matched pixels.

Horizontal and vertical lines (as seen between d=2 to 3) in the minimum cost path 406 have traditionally been considered to represent only occluded regions. For example, in FIG. 4, horizontal lines would be deemed to indicate pixels that are occluded from the right camera, while vertical lines would be deemed to indicate pixels that are occluded from the left camera.

However, in an approach described herein, horizontal and vertical lines are considered to indicate at least either occluded pixels or matched pixels of non-fronto-parallel surfaces. Non-fronto-parallel surfaces cause multiple pixels from one camera image to match with a single pixel in the other camera image, thereby inducing a horizontal or vertical line in the stereo disparity graph.

Figure 5:
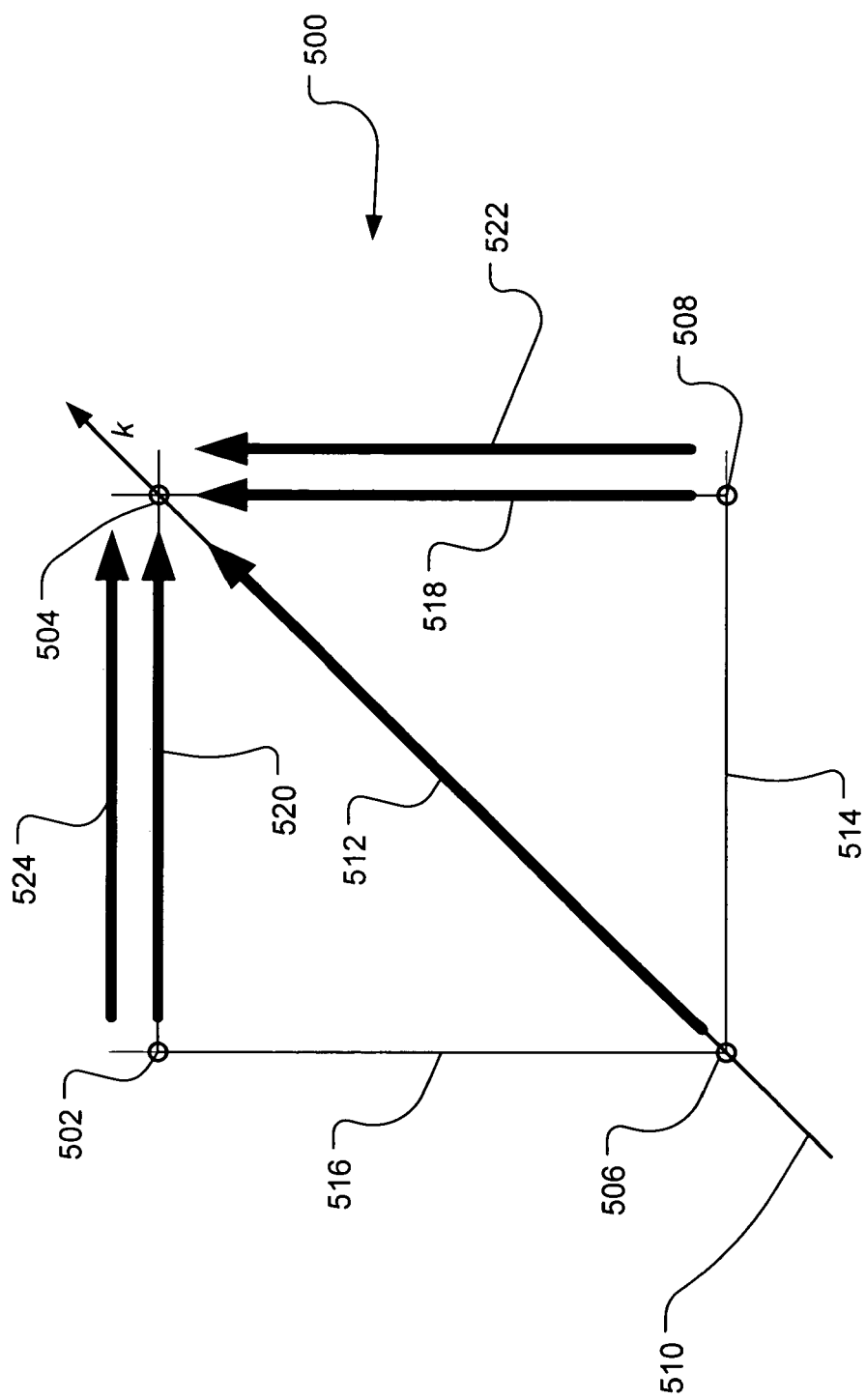
FIG. 5 illustrates an exemplary five-move disparity process model.

FIG. 5 illustrates an exemplary 5-move disparity process model 500. The points 502, 504, 506, and 508 represent possible pixels in the stereo disparity graph, such that the diagonal axis 510 represents a diagonal move 512 between pixels in a stereo disparity graph. The horizontal axis 514 represents a horizontal move between pixels in a stereo disparity graph and the vertical axis 516 represents a horizontal move between pixels in a stereo disparity graph.

However, as discussed above, horizontal and vertical moves (i.e., non-diagonal moves) can represent at least either occluded pixels or matched pixels of non-fronto-parallel surfaces. Therefore, two categories of such moves are designated in each direction: (non-fronto-parallel) matched moves (518 and 520) and occluded moves (522 and 524). As such, FIG. 5 illustrates a 5-move disparity process model, although a 4 move model may also be employed.

FIGS. 6, 7, and 8 combine to represent a 3-plane representation of the 5-move disparity model, but they are split out into separate figures for clarity. The 5 move model applies to moves between adjacent pixels in the stereo disparity graph.

In one implementation, to distinguish between (non-fronto-parallel) matched moves and occluded moves, three planes are used: a left-occluded plane L, a matched plane M, and a right-occluded plane R.

In FIG. 6, the moves from an occluded plane to the matched plane are shown (from empty circle to filled circle) in model portion 600. A cost penalty of β is applied to these moves. In FIG. 7, the moves 700 and 702 from the matched plane to an occluded plane are shown (from empty circle to filled circle) in model portion 704. A cost penalty of β is applied to these moves. Also in FIG. 7, the moves 706 and 708 from one pixel in an occluded plane to another pixel in the same occluded plane are shown (from empty circle to filled circle) in the model portion 704. A cost penalty of α is applied to these moves. In one implementation, α is set to 0.5 and β is set to 1.0, although other value combinations are also contemplated. In FIG. 8, the moves from one pixel in the matched plane to another pixel in the matched plane are shown (from empty circle to filled circle) in the model portion 800. No cost penalty is applied to these moves.

The 3-plane model provides a basis for altering the individual costs to distinguish between different types of moves. For example, biasing the penalty costs against inter-plane moves tends to keep runs of occluded or non-occluded pixels together, thus reducing most of the inaccuracies in the reconstruction of occlusions and disparities. Also, logically impossible moves, such as the direct transition between left and right occlusions are prohibited simply by removing certain transitions from the set of allowed transitions in the 3-plane graph.

In one implementation, the cost $C(A \rightarrow B)$ of a generic transition between two planes A and B is manually set, but it is also possible to set $C(A \rightarrow B)$ probabilistically. Moreover, it may be assumed that $C(A \rightarrow B)$ is symmetric (i.e., $C(A \rightarrow B) = C(B \rightarrow A)$). This assumption leads to the two penalty parameters: α being the penalty for a move within an occluded plane, and β being the cost of a move between different planes.

As such, in this exemplary implementation, the matrices of cumulative costs CL, CM, and CR (one for each plane in the graph) are initialized to ∞ everywhere except in the right occluded plane, where:

$$C_R(i,0) = i\alpha \quad (5)$$

and the forward step of the dynamic programming proceeds as follows:

$$C_L(l, r) = \min \begin{cases} C_L(l, r-1) + \alpha \\ C_M(l, r-1) + \beta \end{cases} \quad (6)$$

$$C_M(l, r) = M(l, r) + \min \begin{cases} C_M(l-1, r) \\ C_L(l-1, r) + \beta \\ C_R(l-1, r) + \beta \\ C_M(l, r-1) \\ C_L(l, r-1) + \beta \\ C_R(l, r-1) + \beta \\ C_M(l-1, r-1) \\ C_L(l-1, r-1) + \beta \\ C_R(l-1, r-1) + \beta \end{cases} \quad (7)$$

$$C_R(l, r) = \min \begin{cases} C_R(l-1, r) + \alpha \\ C_M(l-1, r) + \beta \end{cases} \quad (8)$$

wherein M(l,r) is the cost of matching the $l^{th}$ pixel in the left scan line with the $r^{th}$ pixel in the right scan line.

Based on these costs, the minimum cost path is determined for the scan line pair. The matching cost computation and the dynamic programming are repeated for each scan line pair in the stereo images. The synthesis of the cyclopean virtual view can be done for each scan line by taking a point p on the minimum cost path, taking the colors of the corresponding pixels $p_l$ and $p_r$ in the left and right scan lines, averaging them together, and projecting the newly obtained pixel orthogonally to the virtual image plane into the virtual image point $p_v$.

FIG. 9 illustrates an exemplary stereo disparity graph for matched points. A stereo disparity graph 900 shows an axis 902, representing a sequence of positions along a left scan line L, and another axis 904 representing a sequence of positions along a right scan line R. The minimum cost path 906 indicates minimum cost matches between pixels in given sequential positions in L with pixels in given sequential positions in R. The disparity associated with a point on the minimum cost path 906 is defined as the orthogonal distance of the point from a virtual scan line 908.

A matched point p is projected orthogonally onto its corresponding point $p_v$ on the virtual scan line 908 to designate the position of the corresponding cyclopean virtual image pixel on the virtual scan line. The pixel value of the virtual pixel $p_v$ is the average of the corresponding pixels $p_l$ and $p_r$.

FIG. 10 illustrates an exemplary stereo disparity graph for occluded points. A stereo disparity graph 1000 shows an axis 1002, representing a sequence of positions along a left scan line L, and another axis 1004 representing a sequence of positions along a right scan line R. The minimum cost path 1006 indicates minimum cost matches between pixels in given sequential positions in L with pixels in given sequential positions in R. The disparity associated with a point on the minimum cost path 1006 is defined as the orthogonal distance of the point from a virtual scan line 1008.

An occluded point p on the continuation 1010 of the background (with the same disparity) is projected orthogonally onto its corresponding point $p_v$ on the virtual scan line 1008. Because p represents a pixel within a left occlusion in this illustration, the pixel value of $p_v$ is the same as that of the corresponding point $p_r$ on the right view only.

FIG. 11 illustrates exemplary operations for performing gaze manipulation. A receipt operation 1100 receives the stereo images from the stereo cameras. A computation operation 1102 computes the matching cost for each pixel of the epipolar line pair. A filtering operation 1104 filters the matching costs to reduce streaky artifacts caused by scan line independence.

A dynamic programming operation 1106 alters the initially computed individual costs for each pixel pair to designate different types of moves and therefore different types of disparities (e.g., occlusion disparities versus non-fronto-parallel disparities). Based on the altered costs, a minimum cost path is identified in a path operation 1108. An imaging operation 1110 determines the cyclopean virtual scan line based on the minimum cost path in the stereo disparity graph.

While FIGS. 5-8 address a five-move, three-plane disparity model, other models may also be employed. For example, a four-move, four-plane model can prove as reliable and easier to use. In particular, in one implementation of a four-move mode, every possible path through the cost space has the same length (i.e., the same Manhattan distance between the opposite corners of the cost space), thus making the comparison of path costs more meaningful. Furthermore, the removal of the diagonal move (see move 512 in FIG. 5) makes the model symmetrical and thus more suitable for a possible probabilistic formulation.

FIG. 12 illustrates an exemplary four-move disparity process model 1200. The points 1202, 1204, 1206, and 1208 represent possible pixels in the stereo disparity graph, such that the diagonal axis 1210 a zero-disparity axis in a stereo disparity graph. However, in the four-move model 1200, no diagonal move is modeled. The horizontal axis 1214 represents a horizontal move between pixels in a stereo disparity graph and the vertical axis 1216 represents a horizontal move between pixels in a stereo disparity graph.

As discussed above, horizontal and vertical moves (i.e., non-diagonal moves) can represent at least either occluded pixels or matched pixels of non-fronto-parallel surfaces. Therefore, two categories of such moves are designated in each direction: (non-fronto-parallel) matched moves (1218 and 1220) and occluded moves (1222 and 1224). As such, FIG. 12 illustrates a four-move disparity process model.

FIGS. 13, 14, and 15 combine to represent a four-plane representation of the four-move disparity model, but they are split out into separate figures for clarity. The four-move model applies to moves between adjacent pixels in the stereo disparity graph. In the illustrated implementation, to distinguish between (non-fronto-parallel) matched moves and occluded moves, four planes are used: a left-occluded plane LO, a left matched plane LM, a right matched plane RM, and a right-occluded plane RO. In this model, a typical "matched" move, which in a five-move model would involve a diagonal move, would involve two matched moves, one vertical and one horizontal in a 2D graph or a two-move oscillation between two adjacent matched planes (e.g., from LM to RM and back to LM).

In FIG. 13, the moves within individual planes are shown (from empty circle to filled circle) in model portion 1300. Again, logically impossible moves, such as the direct transition between left and right occlusions are prohibited simply by removing certain transitions from the set of allowed transitions in the four-plane graph. A cost penalty of $\alpha$ is applied to the moves with the occluded planes LO and RO, and a cost penalty of $\gamma+M(l,r)$ for moves within the matched planes LM and RM. In FIG. 14, the moves between an occluded plane and an adjacent matched plane are shown (from empty circle to filled circle) in model portion 1400. A cost penalty of $\beta+M(l,r)$ is applied to moves from an occluded plane to an adjacent matched plane, a cost penalty of $\beta$ is applied to moves from a matched plane to an adjacent occluded plane, and a cost penalty of $M(l,r)$ is applied to moves between matched planes. In FIG. 15, the moves between an occluded plane and a non-adjacent matched plane are shown (from empty circle to filled circle) in model portion 1500. A cost penalty of $\beta+M(l,r)$ is applied to moves from an occluded plane to a non-adjacent matched plane, and a cost penalty of $\beta$ is applied to moves from a matched plane to a non-adjacent occluded plane. In one implementation, $\alpha$ is set to 0.5, $\beta$ is set to 1.0, and $\gamma$ is set to 0.25, although other value combinations are also contemplated.

The four-plane model provides a basis for altering the individual costs to distinguish between different types of moves. For example, heavily biasing the penalty costs against moves in and out of an occluded plane tends to keep runs of occluded pixels together, thus reducing most of the inaccuracies in the reconstruction of occlusions and disparities. Therefore, once a path enters an occluded plane, the path is encouraged to stay in that plane unless a pair of strongly matched pixels is found (i.e., low $M(l,r)$ cost). In contrast, biasing moves within a single matched plane, albeit less heavily, discourages runs of matched moves, thereby favoring surfaces that are close to fronto-parallel. Hence, in this model, slanted surfaces are modeled as oscillations between the two matched planes.

As such, in this exemplary implementation, the matrices of cumulative costs $C_{L_O}$, $C_{L_M}$, $C_{R_M}$, and $C_{R_O}$ (one for each plane in the graph) are initialized to $+\infty$ everywhere except in the right occluded plane, where:

$$C_{R_O}(i,0) = i\alpha \qquad (9)$$

and the forward step of the dynamic programming proceeds as follows:

$$C_{L_O}(l, r) = \min \begin{cases} C_{L_O}(l, r-1) + \alpha \\ C_{L_M}(l, r-1) + \beta \\ C_{R_M}(l, r-1) + \beta \end{cases} \qquad (9)$$

$$C_{L_M}(l, r) = M(l, r) + \min \begin{cases} C_{L_M}(l, r-1) + \gamma \\ C_{R_M}(l, r-1) \\ C_{L_O}(l, r-1) + \beta \\ C_{R_O}(l, r-1) + \beta \end{cases} \qquad (10)$$

$$C_{R_M}(l, r) = M(l, r) + \min \begin{cases} C_{L_M}(l-1, r) \\ C_{R_M}(l-1, r) + \gamma \\ C_{L_O}(l-1, r) + \beta \\ C_{R_O}(l-1, r) + \beta \end{cases} \qquad (11)$$

$$C_{R_O}(l, r) = \min \begin{cases} C_{R_O}(l-1, r) + \alpha \\ C_{L_M}(l-1, r) + \beta \\ C_{R_M}(l-1, r) + \beta \end{cases} \qquad (12)$$

wherein $M(l,r)$ is the cost of matching the $l^{th}$ pixel in the left scan line with the $r^{th}$ pixel in the right scan line.

Based on these costs, the minimum cost path is determined for the scan line pair. The matching cost computation and the dynamic programming are repeated for each scan line pair in the stereo images. The synthesis of the cyclopean virtual view can be done for each scan line by taking a point p on the minimum cost path, taking the colors of the corresponding pixels $p_l$ and $p_r$ in the left and right scan lines, averaging them together, and projecting the newly obtained pixel orthogonally to the virtual image plane into the virtual image point $p_v$.

The exemplary hardware and operating environment of FIG. 16 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24.

The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 16. The logical connections depicted in FIG. 16 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a dynamic programming module, a cyclopean virtual image generator, a virtual camera translation module, and other modules may be incorporated as part of the operating system 35, application programs 36, or other program modules 37. The stereo disparity surface data, matching costs, altered costs, and cyclopean virtual image data may be stored as program data 38.

FIG. 17 illustrates notation useful in describing three dimensional translation of a virtual camera. As shown by legend 1700, the diagram in FIG. 17 is described in the context of three dimensions (i.e., X, Y, and Z), although alternative numbers of dimensions are contemplated (e.g., in one dimension or in two dimensions). Points $Q_l$, $Q_r$, and $Q_v$, represent the optical centers of a left camera 1702, a right camera 1704, and a virtual camera 1706 respectfully. The image captured by the right camera is shown as right image 1710; the image captured by the left camera is shown as left image 1712. The optical center $Q_v$ of the virtual camera 1706 can be placed anywhere in space and the corresponding virtual image is synthesized using the operations described herein. The image "captured" by the virtual camera 1706 is shown as virtual image 1714.

The point $\mathbb{P}$ (1708) represents a point in the scene that is projected to points $p_l=(x_l, y_l)^T$ and $p_r=(x_r, y_r)^T$ respectively. Also, $\mathbb{P}$ is projected on a centered virtual camera (not shown) with an optical center of $Q_c$ in a centered location in the display screen at the point $p_c=(x_c, y_c)^T$ and on the virtual camera (with optical center in $Q_v$ in generic position) at the point $p_v=(x_v, y_v)^T$.

FIG. 18 illustrates exemplary translation of a virtual camera in accordance with movement of a center of projection $Q$, which is mapped to the location of the virtual camera $Q_v$. Moving the center of projection $Q$ in any dimension maps to movement of the virtual camera in that same direction. A reference coordinate system has its origin at a centered point $(x_c, y_c, d)$ 1801 in the virtual image plane, from which a center of projection $Q_c$ 1800 corresponding to a centered virtual camera is positioned at a distance d from the virtual image plane 1806.

A left image 1802 and a right image 1804 characterize a cyclopean virtual image plane 1806, as discussed previously herein. The point P(X,Y,Z) 1808 on the stereo disparity surface 1810 is projected from the center of projection Q to a virtual point $p_v$ 1812 on the virtual image plane 1806.

FIG. 19 illustrates exemplary projection of a translated virtual camera projection point $Q_T$ 1900 through a stereo disparity surface 1902 onto a virtual image plane 1904. The translation T may be performed in one or more dimensions. The axis of the center of projection $Q_c$ 1906 of a centered virtual camera is shown at 1908 as a reference to the translation to translated virtual camera projection point $Q_T$ 1900.

Multiple projection rays are shown in FIG. 19 to illustrate projection from $Q_T$ 1900 to the virtual image plane 1904. The larger dots are intended to represent intersections of the projection with the stereo disparity surface 1902, whereas the smaller dots are intended to represent intersections of the projection with the virtual image plane 1904.

The disparity between the left and right image points is computed as $$d = x_l - x_r = f_x \frac{B}{Z} \quad (13)$$

where B represents the baseline distance between the physical stereo cameras and f represents the focal point.

In the centered camera, by triangle similarity, $x_c$ is computed as:

$$x_c = f \frac{X}{Z} \quad (14)$$

For the virtual camera with optical center in $O_v = (T_x, T_y, T_z)^T$, where $T_x$, $T_y$, and $T_z$ represent the translation coordinates of the translated optical center $O_v$:

$$(X - T_x) : x_v = (z - T_z) : f \quad (15)$$

from which $$x_v = f \frac{X - T_x}{Z - T_z} \quad (16)$$

By substituting Equations (13) and (14) into Equation (16), $x_v$ may be obtained:

$$x_v = \frac{x_c - \frac{dT_x}{B}}{1 - \frac{dT_z}{fB}} \quad (17)$$

which, in combination with an analogous equations for the $y_v$ coordinate, can be rewritten in homogeneous coordinates as:

$$\begin{pmatrix} x_v \\ y_v \\ w \end{pmatrix} = \begin{bmatrix} 1 & 0 & -\frac{T_x}{B} & 0 \\ 0 & 1 & -\frac{T_y}{B} & 0 \\ 0 & 0 & -\frac{T_z}{fB} & 1 \end{bmatrix} \begin{pmatrix} x_c \\ y_c \\ d \\ 1 \end{pmatrix} \quad (18)$$

where w represents a projective depth value and the matrix in the square brackets of Equation (18) represent the projection matrix. Accordingly, the point on the virtual image plane $p_v = (x_v, y_v)^T$ may be computed from Equation (18).

Equation (18) represents a projection of three-dimensional points into a plane. The first factor on the right side of the equals sign of Equation (18) is referred to as a "projection matrix". It can be proven that Equation (18) corresponds to projecting points of the disparity surface into the corresponding points on the plane of the virtual image (up to a scaled, diagonal matrix) as illustrated in FIG. 19.

From Equation (18), the center of the projection $Q_T$ is readily computed as the null vector of the projection matrix, thus yielding:

$$Q_T = \left( \frac{T_x}{B} \quad \frac{T_y}{B} \quad 1 \quad \frac{T_z}{fB} \right)^T \quad (19)$$

For $T_z = 0$, the transformation in Equation (19) is a parallel projection ($Q$ is at infinity). As such, horizontal translation of the virtual camera (i.e., in the X direction) and vertical translation of the virtual camera (i.e., in the Y direction) can be simulated by projection of points of the stereo disparity surface onto the virtual image plane via parallel rays. The axial translation of the virtual camera (i.e., in the Z direction) can be simulated by means of a central projection with a finite center of projection $Q$.

FIG. 20 illustrates results of exemplary forward/inverse translation of a virtual camera. A left image 2000 and a right image 2002 may be combined as described herein to generate a centered virtual image 2004. Examples of the results of translation on the Z-axis, forward into the image and inverse out of the image, are shown as forward image 2006 and inverse image 2008.

FIG. 21 illustrates results of exemplary in-plane translation of a virtual camera. In-plane connotes translation in a plane that is substantially parallel to the virtual image plane. A centered virtual image 2100 is shown in relation to various in-plane translations thereof. FIG. 21 includes an "up" image 2102 and a "down" image 2104 as examples of pure translations on the Y-axis and a "left" image 2106 and a "right" image 2108 as examples of pure translations on the X-axis. In addition, FIG. 21 includes an "up-left" image 2110, an "up-right" image 2112, a "down-left" image 2114, and a "down-right" image 2116 as examples of mixed translations on both the X and Y axes. It should be understood, however, that translations on one or both of the X and/or Y axes may also be combined with a translation on the Z-axis.

FIG. 22 illustrates exemplary operations 2200 for translating a virtual camera in multiple dimensions. A determining operation 2202 determines the stereo disparity surface (e.g., such as computing a minimum cost surface or by some other means) from a plurality of physical cameras. In various implementations, the 3-plane and 4-plane models and their corresponding algorithms may be employed, although other methods of determining a stereo disparity surface may also be employed. Another determining operation 2204 determines the position of the display window and the position of the virtual camera within it to determine $Q_v = (T_x, T_y, T_z)$.

A computation operation 2206 computes $Q_T$, such as by using Equation (19), from the $\mathbb{T}$ (translation) components. Another computation operation 2208 computes $p_v = (x_v, y_v)^T$, such as by using Equation (18).

A pixel operation 2210 computes the pixel value to be assigned to the point $p_v$ in the virtual image plane. In one implementation, given a point p on the stereo disparity surface and its corresponding virtual position $p_v$ on the virtual image plane, the corresponding pixel value (e.g., intensity or color) of $p_v$ may be computed from a combination of the pixel values of the corresponding pixels $p_r$ and $p_l$ in the right and left input images. Note that this applies to matched pixels; the values of occluded pixels are taken from the corresponding pixel in the non-occluded image (e.g., right or left). Furthermore, forward/inverse projections and bilinear interpolation may be used to compute the pixel value.

In one implementation, the pixel value computation may be performed using the following weighted average equation:

$$I^v(p_v)=(1-\mu)I^l(p_l)+\mu I^r(p_r) \quad (20)$$

with $$\mu = \frac{|O_x^v - O_x^l|}{B} \quad (21)$$

where the subscript x in Equation (21) indicates the x component of the optical centers of the two input cameras. Analogous equations may be developed for alternative camera configurations (e.g., top/bottom stereo cameras, multiple pairs of cameras, etc.).

Given the pixel location in the virtual image plane (i.e., $p_v$) and the pixel value to be assigned to that pixel location (e.g., $I^v(p_v)$), as well as locations and pixel values for other points in the virtual image plane, a display operation 2212 computes the set of virtual scan lines that complete the virtual image (e.g., the virtual image of a video conference frame) and then displays the virtual image in the display window of the recipient's system, stores in an image or video file, or otherwise processes the virtual image. For example, having generated the virtual image, the transmitting video conference system can transmit the virtual image to the other conference participants, who see an image of the user appearing to look them in the eye, so to speak. During the video conference, the user may move his or her display window relative to the physical cameras (e.g., changing the T components), which translates the virtual camera in-plane so that the virtual camera and the display window remain in alignment. In addition, a recipient may signal the user's system to change the axial position of the virtual camera, so as to translate the virtual camera along the Z-axis.

In order to produce high quality images based on the projection from the optical center through a single point in the stereo disparity surface to multiple points on the virtual image plane, forward mapping, inverse mapping and bilinear interpolation techniques may be used. FIGS. 23-25 illustrate exemplary aspects of such techniques.

FIG. 23 illustrates an exemplary forward mapping relative to a minimum cost path. A diagram 2300 shows an axis 2302, representing a sequence of integer positions 2303 along a left epipolar line L, and another axis 2304 representing a sequence of integer positions along a right epipolar line R. "Integer position" represents a position on the scan line corresponding to a single pixel value; whereas a "floating point position" represents any position on the scan line, whether an integer position or not (e.g., a position between individual pixels values). A virtual scan line 2306 represents a sequence of integer positions 2308 along a scan line of the virtual camera image. A minimum cost path 2310 indicates matches between pixels in given sequential integer positions 2314 in L with pixels in given sequential integer positions in R. A center of projection Q (2312), which is mapped to represent the location of the virtual camera $Q_v$.

Forward mapping from the center of projection Q to the virtual scan line 2306 maps through the minimum cost path 2310 at the integer positions 2314. However, with forward mapping alone, points 2314 on the minimum cost path 2310 do not necessarily map to integer positions 2314 on the virtual scan line 2306 (see e.g., point 2316). This imprecise mapping may result in holes or artifacts in the virtual image.

As such, in one implementation, the forward mapping is combined with an inverse mapping from the virtual scan line 2306 to the center or projection Q. The forward mapping operation designates the integer positions 2314 on the minimum cost path 2310, and the inverse mapping operation designates the intersection of the minimum cost path 2310 and the inverse projection from an integer point (e.g., point 2318) on the virtual scan line 2306 to the center or projection Q. The intersection may coincide with an integer position or any floating point position on the minimum cost path 2310.

FIG. 24 illustrates exemplary inverse mapping relative to a minimum cost path. A diagram 2400 shows an axis 2402, representing a sequence of integer positions 2403 along a left epipolar line L, and another axis 2404 representing a sequence of positions along a right epipolar line R. A virtual scan line 2406 represents a sequence of integer positions along a scan line of the virtual camera image. A minimum cost path 2408 indicates matches between pixels in given sequential integer positions in L with pixels in given sequential positions in R. A center of projection Q (2410), which is mapped to represent the location of the virtual camera $Q_v$.

An integer position 2412 on the virtual scan line 2406 is identified between each pair of forward mapped floating point position 2414 on the virtual scan line 2406. The integer position 2412 is then inversely projected to the center of projection Q through the minimum cost path 2408 to identify an inverse mapping point 2416 at the intersection of the inverse projection with the minimum cost path 2408.

FIG. 25 illustrates exemplary bilinear interpolation. A diagram 2500 shows an axis 2502, representing a sequence of integer positions 2503 along a left epipolar line L, and another axis 2504 representing a sequence of positions along a right epipolar line R. A virtual scan line 2506 represents a sequence of integer positions along a scan line of the virtual camera image. A minimum cost path 2508 indicates matches between pixels in given sequential integer positions in L with pixels in given sequential positions in R. A center of projection Q (2510), which is mapped to represent the location of the virtual camera $Q_v$.

An inverse mapping has identified an inverse mapping point 2512 on the minimum cost path 2508. (The inverse mapping point 2512 is mapped from an integer position 2514 on the virtual scan line 2506 to Q. Given this inverse mapping point 2512, corresponding integer positions 2516 and 2518 are identified on each axis (i.e., the right epipolar line R and the left epipolar line L). For each corresponding floating point position 2516 and 2518, a floating point pixel value is interpolated from the adjacent integer pixel pair 2503. The resulting floating point pixel value may then contribute to the integer position 2514 on the virtual scan line 2506. In this manner, the pixel values of the pixels at integer positions on the virtual scan line 2506 may be computed through bilinear interpolation of corresponding integer pixel values of the right and left epipolar lines.

It should be understood that, if the forward mapping terminates at an integer position on the virtual scan line, the inverse mapping and bilinear interpolation operation may be omitted because an integer pixel value may be directly selected from the left and right scan lines. Furthermore, if the pixels of both the left or right scan line are not occluded, the resulting pixel values may be attributed to the corresponding integer position on the virtual scan line using a weighted average; whereas, if the position on either the left or right scan line is occluded, the pixel value of the non-occluded pixel may be attributed to the corresponding integer position on the virtual scan line.

The embodiments of the invention described herein are implemented as logical steps in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the structure and use of exemplary embodiments of the invention. Since many embodiments of the invention can be made without departing from the spirit and scope of the invention, the invention resides in the claims hereinafter appended.

What is claimed is:

1. A method comprising:
    computing a stereo disparity surface between a first image and a second image of a stereo image pair;
    computing an integer position on a virtual image plane from a projection between the virtual image plane and a center of projection through a projected point on the stereo disparity surface to the virtual image plane; and
    setting a pixel value of the integer position on the virtual image plane based on the projected point on the stereo disparity surface, wherein the setting operation comprises:
        setting the pixel value of the integer position on the virtual image plane to a pixel value from one or more integer positions of the first image that corresponds with the projected point on the stereo disparity surface, if one or more integer positions of the second image that corresponds with the projected point on the stereo disparity surface are occluded,
    wherein computing the stereo disparity surface, computing the integer position and setting the pixel value are controlled by a processor operating with a memory.

2. The method of claim 1 wherein the setting operation comprises:
    setting the pixel value of the integer position on the virtual image plane as a weighted average of pixel values from integer positions of the first and second images that correspond with the projected point on the stereo disparity surface, if the integer positions of the first and second images that correspond with the projected point on the stereo disparity surface are not occluded.

3. The method of claim 1 wherein the center of projection is translatable in a plane parallel to the virtual image plane.

4. The method of claim 1 wherein the center of projection is translatable along a normal axis from the virtual image plane.

5. The method of claim 1 wherein the center of projection maps to a virtual camera position.

6. The method of claim 1 wherein the operation of computing an integer position on the virtual image plane comprises:
    applying a projection matrix to a centered point in the virtual image plane to determine the location of the point on the virtual image plane.

7. The method of claim 1 wherein the operation of computing an integer position on the virtual image plane comprises:
    projecting the center of projection through the projected point on the stereo disparity surface to the virtual image plane.

8. The method of claim 1 wherein the operation of computing an integer position on the virtual image plane comprises:
    projecting the center of projection the projected point on the stereo disparity surface to the virtual image plane, the projected point being at an integer position on the stereo disparity surface.

9. The method of claim 1 wherein the operation of computing an integer position on the virtual image plane comprises:
    projecting the center of projection through the projected point on the stereo disparity surface to a floating point position on the virtual image plane; and
    projecting an integer position on the virtual image plane to identify the projected point on the stereo disparity surface, the integer position being adjacent to the floating point position on the virtual image plane.

10. The method of claim 1 wherein the setting operation comprises:
    setting the pixel value associated with the integer position on the virtual image plane to a pixel value computed as a bilinear interpolation of pixel values from integer positions on the first and second images, each integer pixel position being corresponding to the integer position on the virtual image plane through an inverse mapping point on the stereo disparity surface.

11. The method of claim 1 wherein the setting operation comprises:
    setting the pixel value associated with the integer position on the virtual image plane to a pixel value computed as a bilinear interpolation of pixel values from integer positions on the first image, each integer pixel position being corresponding to the integer position on the virtual image plane through an inverse mapping point on the stereo disparity surface.

12. A computer program product, stored on a computer program storage medium, encoding a computer program for executing on a computer system a computer process, the computer process comprising:
    computing a stereo disparity surface between a first image and a second image of a stereo image pair;
    computing an integer position on a virtual image plane from a projection between the virtual image plane and a center of projection through a projected point on the stereo disparity surface to the virtual image plane; and
    setting a pixel value of the integer position on the virtual image plane based on the projected point on the stereo disparity surface, wherein the setting operation comprises:
        setting the pixel value of the integer position on the virtual image plane to a pixel value from one or more integer positions of the first image that corresponds with the projected point on the stereo disparity surface, if one or more integer positions of the second image that corresponds with the projected point on the stereo disparity surface are occluded.

13. The computer program product of claim 12 wherein the setting operation comprises:
    setting the pixel value of the integer position on the virtual image plane as a weighted average of pixel values from integer positions of the first and second images that correspond with the projected point on the stereo disparity surface, if the integer positions of the first and second images that correspond with the projected point on the stereo disparity surface are not occluded.

14. The computer program product of claim 12 wherein the center of projection is translatable in a plane parallel to the virtual image plane.

15. The computer program product of claim 12 wherein the center of projection is translatable along a normal axis from the virtual image plane.

16. The computer program product of claim 12 wherein the center of projection maps to a virtual camera position.

17. The computer program product of claim 12 wherein the operation of computing an integer position on the virtual image plane comprises:
  applying a projection matrix to a centered point in the virtual image plane to determine the location of the point on the virtual image plane.

18. The computer program product of claim 12 wherein the operation of computing an integer position on the virtual image plane comprises:
  projecting the center of projection through the projected point on the stereo disparity surface to the virtual image plane.

19. The computer program product of claim 12 wherein the operation of computing an integer position on the virtual image plane comprises:
  projecting the center of projection the projected point on the stereo disparity surface to the virtual image plane, the projected point being at an integer position on the stereo disparity surface.

20. The computer program product of claim 12 wherein the operation of computing an integer position on the virtual image plane comprises:
  projecting the center of projection through the projected point on the stereo disparity surface to a floating point position on the virtual image plane; and
  projecting an integer position on the virtual image plane to identify the projected point on the stereo disparity surface, the integer position being adjacent to the floating point position on the virtual image plane.

21. The computer program product of claim 12 wherein the setting operation comprises:
  setting the pixel value associated with the integer position on the virtual image plane to a pixel value computed as a bilinear interpolation of pixel values from integer positions on the first and second images, each integer pixel position being corresponding to the integer position on the virtual image plane through an inverse mapping point on the stereo disparity surface.

22. The computer program product of claim 12 wherein the setting operation comprises:
  setting the pixel value associated with the integer position on the virtual image plane to a pixel value computed as a bilinear interpolation of pixel values from integer positions on the first image, each integer pixel position being corresponding to the integer position on the virtual image plane through an inverse mapping point on the stereo disparity surface.

23. A system comprising:
  a dynamic programming module computing a stereo disparity surface between a first image and a second image of a stereo image pair;
  a virtual camera translation module computing an integer position on a virtual image plane from a projection between the virtual image plane and a center of projection through a projected point on the stereo disparity surface to the virtual image plane; and
  a cyclopean virtual image generator setting a pixel value of the integer position on the virtual image plane based on the projected point on the stereo disparity surface, wherein the cyclopean virtual image generator sets the pixel value of the integer position on the virtual image plane to a pixel value from one or more integer positions of the first image that corresponds with the projected point on the stereo disparity surface, if one or more integer positions of the second image that corresponds with the projected point on the stereo disparity surface are occluded.

24. The system of claim 23 wherein the cyclopean virtual image generator sets the pixel value of the integer position on the virtual image plane as a weighted average of pixel values from integer positions of the first and second images that correspond with the projected point on the stereo disparity surface, if the integer positions of the first and second images that correspond with the projected point on the stereo disparity surface are not occluded.

25. The system of claim 23 wherein the center of projection is translatable in a plane parallel to the virtual image plane.

26. The system of claim 23 wherein the center of projection is translatable along a normal axis from the virtual image plane.

27. The system of claim 23 wherein the center of projection maps to a virtual camera position.

28. The system of claim 23 wherein the virtual camera translation module applies a projection matrix to a centered point in the virtual image plane to determine the location of the point on the virtual image plane.

29. The system of claim 23 wherein the virtual camera translation module projects the center of projection through the projected point on the stereo disparity surface to the virtual image plane.

30. The system of claim 23 wherein the virtual camera translation module projects the center of projection the projected point on the stereo disparity surface to the virtual image plane, the projected point being at an integer position on the stereo disparity surface.

31. The system of claim 23 wherein the virtual camera translation module projects the center of projection through the projected point on the stereo disparity surface to a floating point position on the virtual image plane, and projects an integer position on the virtual image plane to identify the projected point on the stereo disparity surface, the integer position being adjacent to the floating point position on the virtual image plane.

32. The system of claim 23 wherein the setting operation comprises:
  setting the pixel value associated with the integer position on the virtual image plane to a pixel value computed as a bilinear interpolation of pixel values from integer positions on the first and second images, each integer pixel position being corresponding to the integer position on the virtual image plane through an inverse mapping point on the stereo disparity surface.

33. The system of claim 23 wherein the cyclopean virtual image generator sets the pixel value associated with the integer position on the virtual image plane to a pixel value computed as a bilinear interpolation of pixel values from integer positions on the first image, each integer pixel position being corresponding to the integer position on the virtual image plane through an inverse mapping point on the stereo disparity surface.

34. A method comprising:
  computing a stereo disparity surface between a first image and a second image of a stereo image pair;

computing an integer position on a virtual image plane from a projection between the virtual image plane and a center of projection through a projected point on the stereo disparity surface to the virtual image plane; and setting a pixel value of the integer position on the virtual image plane based on the projected point on the stereo disparity surface, wherein the operation of computing an integer position on the virtual image plane comprises:

projecting the center of projection through the projected point on the stereo disparity surface to a floating point position on the virtual image plane; and projecting an integer position on the virtual image plane to identify the projected point on the stereo disparity surface, the integer position being adjacent to the floating point position on the virtual image plane, wherein computing the stereo disparity surface, computing the integer position and setting the pixel value are controlled by a processor operating with a memory.

35. A computer program product, stored on a computer program storage medium, encoding a computer program for executing on a computer system a computer process, the computer process comprising:

computing a stereo disparity surface between a first image and a second image of a stereo image pair;

computing an integer position on a virtual image plane from a projection between the virtual image plane and a center of projection through a projected point on the stereo disparity surface to the virtual image plane; and setting a pixel value of the integer position on the virtual image plane based on the projected point on the stereo disparity surface, wherein the operation of computing an integer position on the virtual image plane comprises:

projecting the center of projection through the projected point on the stereo disparity surface to a floating point position on the virtual image plane; and projecting an integer position on the virtual image plane to identify the projected point on the stereo disparity surface, the integer position being adjacent to the floating point position on the virtual image plane.

36. A system comprising:

a dynamic programming module computing a stereo disparity surface between a first image and a second image of a stereo image pair;

a virtual camera translation module computing an integer position on a virtual image plane from a projection between the virtual image plane and a center of projection through a projected point on the stereo disparity surface to the virtual image plane; and a cyclopean virtual image generator setting a pixel value of the integer position on the virtual image plane based on the projected point on the stereo disparity surface, wherein the virtual camera translation module projects the center of projection through the projected point on the stereo disparity surface to a floating point position on the virtual image plane, and projects an integer position on the virtual image plane to identify the projected point on the stereo disparity surface, the integer position being adjacent to the floating point position on the virtual image plane.

* * * * *